(12) United States Patent
B M S et al.

(10) Patent No.: US 12,041,098 B2
(45) Date of Patent: Jul. 16, 2024

(54) AI-BOT BASED IN-MEETING INSTANT QUERY ASSISTANT FOR CONFERENCE MEETINGS

(71) Applicant: Avaya Management L.P., Santa Clara, CA (US)

(72) Inventors: Ganesh B M S, Bengaluru (IN); Sumesh Soman, Bangalore (IN); Srinivas Banda, Bangalore (IN)

(73) Assignee: Avaya Management L.P., Santa Clara, CA (US)

(*) Notice: Subject to any disclaimer, the term of this patent is extended or adjusted under 35 U.S.C. 154(b) by 95 days.

(21) Appl. No.: 16/901,764

(22) Filed: Jun. 15, 2020

(65) Prior Publication Data
US 2021/0390144 A1  Dec. 16, 2021

(51) Int. Cl.
| | |
|---|---|
| H04L 65/1093 | (2022.01) |
| G06F 16/9032 | (2019.01) |
| G06N 20/00 | (2019.01) |
| H04L 65/1089 | (2022.01) |
| H04L 65/4053 | (2022.01) |

(52) U.S. Cl.
CPC .... *H04L 65/1093* (2013.01); *G06F 16/90332* (2019.01); *G06N 20/00* (2019.01); *H04L 65/1089* (2013.01); *H04L 65/4053* (2013.01)

(58) Field of Classification Search
None
See application file for complete search history.

(56) References Cited

U.S. PATENT DOCUMENTS

| | | | |
|---|---|---|---|
| 7,787,609 B1 | 8/2010 | Flockhart et al. | |
| 8,700,665 B2* | 4/2014 | Beauregard | H04L 12/1822 707/791 |
| 9,317,574 B1* | 4/2016 | Brisebois | G06F 16/951 |
| 2013/0066988 A1* | 3/2013 | Levinson | G06Q 10/107 709/206 |
| 2018/0077088 A1* | 3/2018 | Cabrera-Cordon | H04L 67/306 |
| 2018/0115645 A1* | 4/2018 | Iyer | G06Q 10/063112 |
| 2018/0349754 A1* | 12/2018 | Kumar | G06F 16/9535 |
| 2020/0228358 A1* | 7/2020 | Rampton | G06N 3/006 |
| 2021/0075632 A1* | 3/2021 | Kapinos | H04L 65/1093 |

OTHER PUBLICATIONS

Official Action for India Patent Application No. 202114025075, dated Mar. 11, 2022 8 pages.
Michael "How Chatbots Use Artificial Intelligence to Satisfy Customers Faster & Easier than Ever Before," Freshdesk Blog, Jan. 23, 2019, 6 pages [retrieved online from: www.freshworks.com/freshdesk/customer-support/customer-satisfaction-ai-chatbots-blog/].

* cited by examiner

*Primary Examiner* — Antim G Shah
(74) *Attorney, Agent, or Firm* — Sheridan Ross P.C.

(57) ABSTRACT

Methods and systems are provided for automatically, via an artificial-intelligence bot, receiving a query made by a participant in a conference meeting, determine one or more subject matter experts to contact outside of the conference meeting, receive a response to the query from at least one of the subject matter experts, and present the response to the query to the participants of the conference meeting. The artificial-intelligence bot presents the response to the query while the conference meeting is in progress without any participant of the conference meeting communicating with the subject matter expert, without ever connecting a client device of the subject matter expert to the conference meeting, and without ever including the subject matter expert in the conference meeting.

19 Claims, 10 Drawing Sheets

AI-BOT BASED IN-MEETING INSTANT QUERY ASSISTANT FOR CONFERENCE MEETINGS

FIELD

The present disclosure is generally directed to multi-party communications, in particular, toward conferences established between communication devices of participants.

BACKGROUND

Conferencing, and in particular web-conferencing, includes a range of communication services. These communication services can include, meetings, collaborative communication sessions, and/or other communications that are established between communication devices across a communications network. Information shared during typical collaborative communication sessions may include video, audio, chat, and/or other digital content.

During a conference meeting, a participant may raise a query that requires answering, or addressing, by subject matter experts who are not a part of the meeting. When a particular query cannot be answered by the participants, these queries may be deferred for follow-up actions like emails, additional meetings, chat conversations, and/or other communications with the subject matter experts after the meeting has concluded. The deferring of queries is inconvenient and can cause the overall effectiveness of a conference meeting to be diminished.

DETAILED DESCRIPTION

Figure 1:
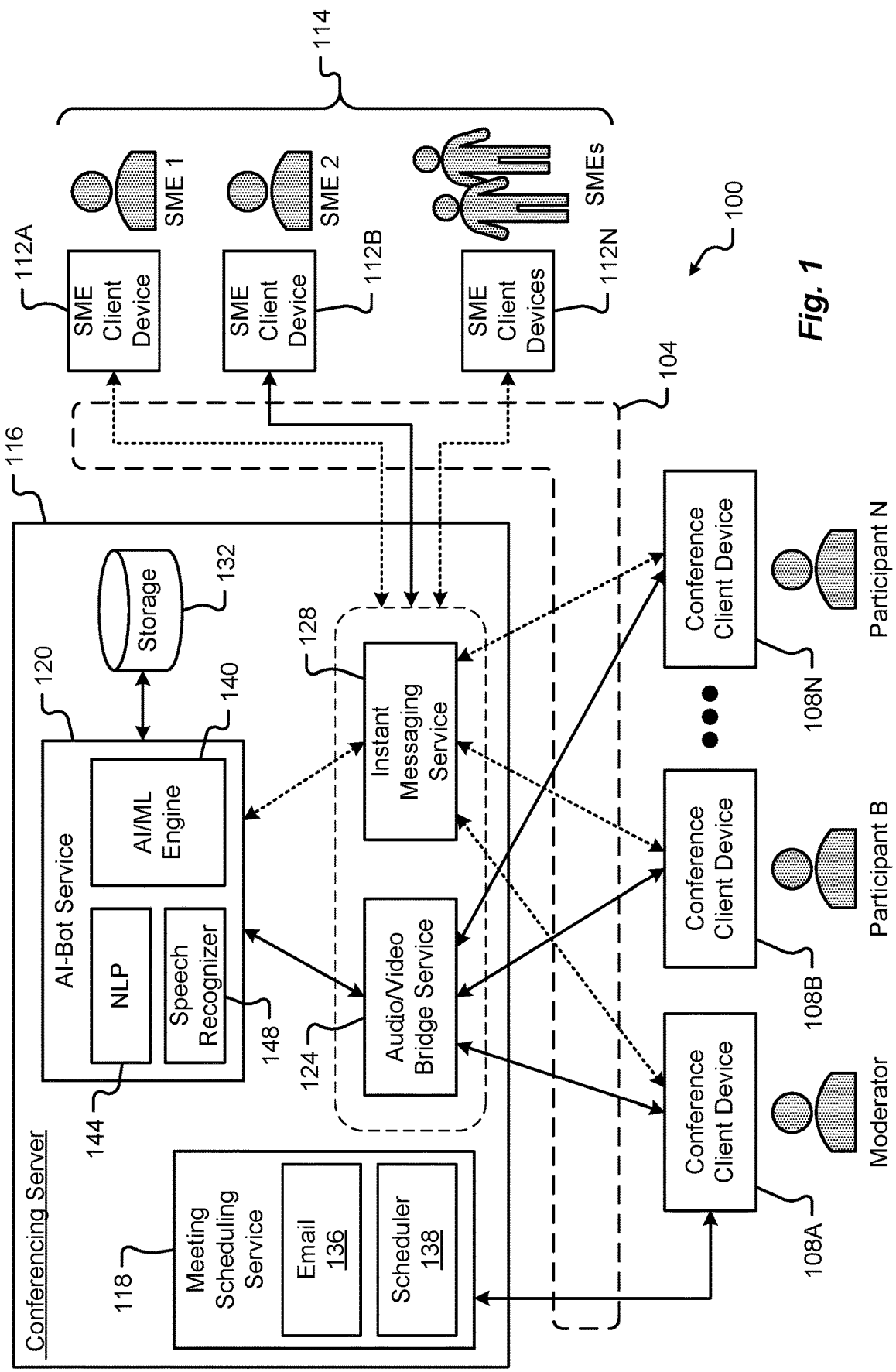
FIG. 1 depicts a block diagram of a communication system in accordance with at least some embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

Embodiments of the present disclosure will be described in connection with the execution of a communication system. The communication system may comprise a conferencing server configured to manage communications between one or more communication client devices. In some cases, the conferencing server may establish collaborative communication sessions, multi-party meetings, or conference meetings, between multiple communication client devices across a communication network. The conference meeting may comprise an audio/video web conference between a moderator and one or more other participants. Additionally or alternatively, the conference meeting may provide instant messaging, texting, and/or chat communications between the participants of the conference meeting and communication session.

In conference meetings, queries are often raised by participants that require consultation of a subject matter expert. The term "query," and variations thereof, as used herein may refer to any question or issue that is raised or asked, in text and/or audio format, by a participant during a conference meeting and that requires the input of, or answering by, a subject matter expert outside of the conference meeting. The term subject matter expert ("SME"), as used herein, may refer to a resource who has extensive knowledge about a particular topic and, in some cases, a topic associated with a query. In some cases, the SME may not be a part of the conference meeting and, as such, the queries may need to be deferred. It is common for participants, such as a presenter or a moderator, to assign follow-up actions to these deferred queries, such as requiring one or more of the participants to connect with SMEs via e-mail, scheduling additional meetings, and/or holding additional chat conversations to answer the deferred query.

The deferring of queries can cause a number of issues including, but in no way limited to, failing to fulfill all items that are part of the conference meeting agenda, failing to arrive at an agreed upon conclusion to the conference meeting, and/or delaying decision making as a part of the conference meeting. As can be appreciated, these issues may result in the participants having a poor conference meeting experience, especially when multiple "showstopper" queries are deferred. A showstopper query may correspond to a query that needs to be answered, or resolved, before the conference meeting can continue and/or before other agenda items can be addressed. Overall, the deferring of queries decreases the effectiveness of conference meetings for all who are involved.

It is with respect to the above issues and other problems that the embodiments presented herein were contemplated. Among other things, the present disclosure solves these and other issues by providing an artificial-intelligence ("AI"), non-human, bot that can automatically receive a query made in the conference meeting, determine one or more SME(s) to contact outside of the conference meeting, receive a response to the query from an SME, and present the response to the query to the participants of the conference meeting. In some embodiments, the AI-bot may present the response to the query while the conference meeting is still in progress without any participant of the conference meeting communicating with the SME, without ever connecting a client device of the SME to the conference meeting, and without ever including the SME in the conference meeting.

Instead of deferring in-meeting queries to follow-up actions, the conference participants can delegate the queries to the AI-bot through either voice, chat, or instant message when the queries require consultation with SME(s). The AI-bot reaches out to pertinent SME(s) instantly through a best reachable communication channel, collect the response from SME(s) and communicate the response to the query back to the participants of the conference meeting. In some embodiments, the communication between the AI-bot and the SME(s) is made without ever adding or bringing the SME(s) into the conference meeting. In one embodiment, the AI-bot provides the response to the query on behalf of the SME without allowing a direct communication from the SME to any participants in the conference meeting, or vice versa.

In some embodiments, the response to the query may be presented by one or more user interfaces, or displays, of at least one participant's conference client device. The interfaces and/or displays described herein may be provided to a moderator, a presenter, and/or other participant in the conference meeting.

In addition to providing in-meeting instant query assistance, the AI-bot may also learn and recommend the best SME(s) to consult by analyzing the historical data of SME(s) including accuracy of the responses, swiftness in responding to queries, and the availability of the SME(s) during the conference meeting duration. Based on the learning, the AI-bot may also provide suggestions to the SME(s) to handle the queries quickly. For instance, the AI-bot may determine suggested responses to queries based on historical responses made, conference meeting information, participation information, confidence levels of the responses, and/or other machine learning data.

In one embodiment, the conferencing server may provide in-meeting instant query assistance from SME(s) through an AI-bot that learns, recommends the best SME(s), and reaches out to the SME(s) transparently with the learned response suggestions.

Typically, when scheduling an audio or video conference meeting, a moderator uses a respective conferencing solution and then shares the conference meeting details with expected participants. These conference meeting details may include, but are in no way limited to, a set meeting time, a meeting web link, and/or a conference bridge dial-in number. In some embodiments, the details may include one or more of an extension, personal identification number (PIN), and/or a passcode to access the conference meeting. Participants can join the meeting using a conference client device which is capable of communicating via audio, video, and/or instant messaging.

The AI-bot may use information obtained from the conference meeting details as an initial source of information to determine and identify candidate SME(s) for consultation. These candidate SME(s) may correspond to those SME(s) who may be consulted by the AI-bot during the conference meeting. In one embodiment, an initial source of SME(s) information for AI-bot may be organization level data sources. The SME(s) information may include at least one communication address and an expertise area. The AI-bot may be trained using information from past conference meetings, follow-up queries, and responses/answers from SME(s).

Additionally or alternatively, a moderator or other privileged participant of the conference meeting may be allowed to configure SME(s) details while scheduling the conference meeting. This configuration option may include, but is in no way limited to, a name of the topic for which SME consultation is anticipated, a group of SME(s) for the topic, an agenda, and/or the like.

In some embodiments, the conferencing server may instantiate an AI-bot instance when the meeting reminder time is triggered.

In one embodiment, for example, where SME details are configured by a moderator or other privileged participant of the conference meeting, the AI-bot may check the availability of the SME(s). In some embodiments, the AI-bot may check the availability of SME(s) when determining appropriate SME(s) for potential consultation. In any event, the AI-bot may check availability of SME(s) through any possible communication channel, for example, through instant message ("IM") presence, calendar availability, an interactive ping instant message, and/or other availability status indicators. Upon confirming the availability confirmation, the AI-bot reminds SME(s) about the conference meeting with at least a portion of the meeting details, agenda, and assigned topic. However, in some embodiments, the SME(s) may be restricted from participating in the conference meeting.

When the conference meeting is started, the conferencing server creates the required resources to run the conference meeting such as audio or video bridge and group chat. The conferencing server associates the AI-bot instance to both the meeting bridge and the group chat. From this point forward, the AI-bot waits for query requests from the conference meeting participants over chat or voice. As can be appreciated, participants are added to the audio/video meeting bridge and group chat when the participants join the conference meeting through the conference client device.

During the conference meeting, any of the participants may raise queries over chat or voice. Raised queries may be answered by other participants including the presenter or moderator. In some embodiments, where the participants are unable to answer the queries, one or more of the participants may require consultation with an SME.

When requiring consultation, the participant may associate the query with a "topic" and/or address the AI-bot with an "identifier" (e.g., keyword or phrase) that automatically delegates the query to the AI-bot. In the case of a voice query, the participant may need to address the AI-bot to delegate the query. For instance, the participant may say "Hey AI-bot" and then follow that phrase with a query the AI-bot will handle.

Upon receiving the queries, the AI-bot may proceed by determining which SME(s) are associated with the "topic" and then forward the queries to the associated SME(s) over any possible communication channel. The AI-bot may determine the best SME(s) by analyzing the historical data of SME(s) such as accuracy and swiftness of the query response and the availability of SME(s) during the meeting duration. If the AI-bot lacks enough historical data required to learn or determine the best SME(s) for the query, the query may be forwarded to all relevant SME(s).

After the SME(s) are identified, the AI-bot analyzes past queries and may determine a set of related response recommendations, or suggested responses, and then forwards the query along with suggested responses to the identified SME(s) to help SME(s) respond to the queries quickly.

Upon receiving the query messages from the AI-bot over IM, text, or voice channels, the SME may answer the query (e.g., by providing a response to the query, etc.). When the AI-bot receives the response from SME(s), the AI-bot may present the response back to the participants of the conference meeting. In one embodiment, the response to the query may be provided by an artificial voice output over the audio channel (e.g., via a speaker, or other audio output, of the conference client device, etc.). In another embodiment, the response to the query may be provided by an artificial video output over the video channel (e.g., via a display, or other video output, of the conference client devices, etc.). In yet another embodiment, the AI-bot may post the response back to the conference meeting group chat and associate the query. The AI-bot may cache the queries until an SME is available or the meeting is completed.

When a conference meeting is completed, the AI-bot may consolidate and share the outstanding queries which are not forwarded to SME(s) due to unavailability or not received the response from SME(s), with the moderator for the further actions.

In some embodiments, the AI-bot learns, recommends the best SME(s), and reaches out to the SME(s) transparently with learned response suggestions. As provided above, the SME(s) are not part of the conference meeting. In one embodiment, the methods described herein may comprise: 1) identifying and recommending the best SME(s); 2) reaching out to SME(s) in an available or possible communication channel; and 3) determine or create a set of related response recommendations based on machine learning.

The phrase "AI-bot service" as used herein may refer to a backend (e.g., server side) service which includes the AI/machine learning engines (e.g., processors, etc.) for identifying/recommending SME(s) and/or response suggestions. The phrase "AI-bot" may refer to a bot that interacts with participants of the conference meeting and with SME(s) separately and through different communication channels and is drive by the AI-bot service. The terms "AI-bot," "bot," "automated bot," and variations thereof, as used herein, may be used interchangeably. In some embodiments, the terms "topic," "context," and variations thereof, as used herein, may be used interchangeably.

In some embodiments, identifying and recommending the best SME(s) may be done by an SME discovery engine component in the AI-bot service.

The AI-bot service may learn about SME(s) and related details based on one or more learning and input sources. For instance, initial learning by the AI-bot service can be done through an organization level data source. For example, one data source may contain SME(s) communication addresses, their expertise topic/subjects associated with a skill set, an expertise area, and/or SME(s) current active projects. The AI-bot service may also be trained using any number of previous conference meeting details, follow-up queries and answers from SME(s).

After the initial learning solution deployment, the AI-bot service may start on-the-fly learning processes from every conference meeting. The AI-bot service may learn the factors with respect to identifying best SME(s) including, but in no way limited to, accuracy of query responses, swiftness of query responses, response feedback from the participants, response turnaround time, extra skills, expertise on new topics, preferable communication channel etc.

Additionally or alternatively, there may be an option available for a moderator, or other privileged participants, of the conference meeting to configure "Instant SME Consultation" details while scheduling the conference meeting or use the available configuration at the organization level, if the moderator, or privileged participants, are anticipating certain queries and one or more SME(s) are known prior to the conference meeting. In some embodiments, this option may be available while scheduling the conference meeting or any time before the conference meeting reminder time.

The AI-bot service may identify the best SME(s) in one or more identifying phases. For instance, in response to receiving queries, the AI-bot may determine/identify the best SME(s) associated with the topic by analyzing the historical data of SME(s) such as accuracy and swiftness of the query response and the availability of SME(s) during the conference meetings.

In one embodiment, where the "Instant SME Consultation" details are configured by a moderator or privileged participants, the AI-bot service gives preference to the configured SME(s) and chooses configured SME(s) when the AI-bot service associates the query to the topic, for which the "Instant SME Consultation" details are available. The AI-bot service may proceed with identifying the best SMEs from its learning. In the event that the AI-bot service determines configured SME(s) are not suitable to answer the queries (e.g., the query is associated with a different topic from which the SME(s) were originally configured, etc.) the SME(s) may be determined to be not suitable.

If the AI-bot lacks enough historical data required to learn or determine the best SME(s) for the query, the query will be forwarded to all relevant (e.g., available, active, highly rated, etc.) SME(s).

The AI-bot service may communicate with SME(s) via a possible communication channel. In one embodiment, the AI-bot service may post queries to the SME(s) via one or more communication channels. In some embodiments, where the "Instant SME Consultation" details are configured by a moderator, or privileged participants, the AI-bot service may check the availability of the SME(s) through any possible communication channel before the meeting. For example, via instant message ("IM") presence or an interactive ping IM. Upon confirming availability of the SME(s), the AI-bot may remind the SME(s) about the conference meeting with the meeting details, agenda, and even an assigned topic. Additionally or alternatively, where the SME(s) are identified by the AI-bot service based on the learning upon receiving queries, the AI-bot service chooses SME(s) preferable/best reachable communication channels from the learning and contact the SME(s) via these communication channels.

It is an aspect of the present disclosure that the AI/machine learning engine may enable the AI-bot to discover SME(s) as well as determine response suggestions. For instance, the AI/machine learning engine may enable the AI-bot to discover best SME(s) who can provide quick and more accurate responses to queries posted by a conference meeting participant, compared to other SME(s). The AI/machine learning engine may enable the AI-bot to provide context or topic relative response suggestions to the discovered SME(s).

The AI/machine learning engine may analyze a number of factors of the SME(s) in discovering SME(s) and/or determining response suggestions. One factor may include the accuracy of the response provided by SME (e.g., past responses to queries, etc.). This may correspond to an ordinal value and may be measured by the participant who posted the query. In some embodiments, this accuracy measurement value may be passed to AI-bot through the feedback action performed by the conference meeting participant. Another factor may include the swiftness of an SME in providing a response to a query posted by a participant. This swiftness may correspond to an ordinal value and may be measured by the AI-bot by using timers associated with when the query was posted to the SME and when the SME responded. Yet another factor may include the availability of the SME to receive consultation queries during the conference meeting duration. This availability may be a nominal value and may be measured by the AI-bot. In some embodiments, one or more of these factors may be used by the AI-Bot to train the machine learning model and predict best SME(s) who can provide more accurate response to the query posted by conference meeting participants.

In training and/or learning relevant topic or context relative query response, the AI/machine learning engine may analyze: 1) every query response received from SME(s); and 2) feedback received for the query from conference meeting participants. The learned relevant or more appropriate context or topic relative query responses may be provided to SME(s) as similar or suggested responses.

Referring now to FIG. 1, a block diagram of a communication system 100 is shown in accordance with at least some embodiments of the present disclosure. The communication system 100 of FIG. 1 may be a distributed system and, in some embodiments, comprises a communication network 104 connecting communication devices 108, 112 with a conferencing server 116. The communication system 100 may include, but is not limited to, a plurality of conference client devices 108A-N, a plurality of SME client devices 112A-N, and the conferencing server 116. In one embodiment, the conference client devices 108A-N may be communicatively connected to an audio/video bridge service 124 and/or an instant messaging service 128 of the conferencing server 116. The conferencing server 116 may provide collaborative communication sessions, conference meetings, multi-party calls, web-based conferencing, web-based seminar ("webinar"), and/or other audio/video communication services. In any event, the conference meetings can include two, three, four, or more conference client devices 108A-N that access the conferencing server 116 via a communication network 104.

The SME client devices 112A-N may each be associated with SMEs 114 who are not participants of the conference meeting between the conference client devices 108A-N. Communications are restricted between the SME client devices 112A-N and the conference client devices 108A-N. For instance, the AI-bot service 120 may utilize the audio/video bridge service 124 and/or the instant messaging service 128 to communicate with the conference client devices 108A-N through a first communication session. The AI-bot service 120 may communicate with the SME client devices 112A-N through a separate and different communication session. In this manner, two-way communications between the participants of the conference meeting and the SMEs 114 is prohibited.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

The conference client devices 108A-N and/or the SME client devices 112A-N may correspond to a computing device, a personal communication device, a portable communication device, a laptop, a smartphone, a tablet, a personal computer, and/or any other device capable of running an operating system ("OS"), at least one communication application, a web browser, or the like. The communication application may be configured to exchange communications between a respective client device 108A-N, 112A-N and the conferencing server 116. For instance, the client devices 108A-N, 112A-N may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These client devices 108A-N, 112A-N may also have any of a variety of applications, including for example, a database client and/or server applications, web browser applications, chat applications, video applications, social media applications, calling applications, etc. A client device 108A-N, 112A-N may alternatively or additionally be any other electronic device, such as a thin-client computer, Internet-enabled mobile telephone, and/or personal digital assistant, capable of communicating via the communication network 104 and/or displaying and navigating web pages or other types of electronic documents.

Additionally or alternatively, communications may be sent and/or received via a respective client device 108A-N, 112A-N as a telephone call, a packet or collection of packets (e.g., IP packets transmitted over an IP network), an email message, an IM, a short message service ("SMS") message, a multimedia messaging service ("MMS") message, a chat, and/or combinations thereof. As shown in FIG. 1, the conference client devices 108A-N may communicate over an audio/video channel (e.g., shown as a communication in solid lines) and/or over an IM channel (e.g., shown as a communication in dashed lines).

As described herein, the conference client devices 108A-N may each be associated with a participant of a conference meeting (e.g., a moderator, presenter, attendee, etc.). On the other hand, the SME client devices 112A-N may each be associated with a particular SME of a group of SMEs 114. The SME client devices 112A-N, as described herein, are not connected to, included in, or a part of, the conference meeting between the participants and the conference client devices 108A-N. The SME client devices 112A-N may communicate over an audio/video channel (e.g., shown as a communication in solid lines) and/or over an IM channel (e.g., shown as a communication in dashed lines) with the AI-bot service 120 outside of an separate from the conference meeting between the participants.

The conferencing server 116 may include hardware and/or software resources that, among other things, provides the ability to hold multi-party calls, conference calls, and/or other collaborative communications. The conferencing server 116 may include a meeting scheduling service 118, an AI-bot service 120, an audio/video bridge service 124, an instant messaging service 128, and storage memory 132 to name a few.

In some embodiments, the meeting scheduling service 118 may be included in the conferencing server 116 and/or as a separate service or system of components apart from the conferencing server 116 in the communication system 100. In any event, the meeting scheduling service 118 provides meeting scheduling resources that can allow a conference meeting organizer, or moderator, to schedule, and invite participants, to a conference meeting. The meeting scheduling service 118 may correspond to a built-in meeting scheduling service such as the meeting and appointment schedulers built into Microsoft Corp.'s Outlook® or Apple Corp.'s Calendar applications, etc. In some embodiments, a meeting organizer (e.g., the moderator) may setup a meeting by communicating with the meeting scheduling service 118 over the communication network 104 via the first conference client device 108A. The meeting scheduling service 118 may comprise email instructions 136 and scheduler instructions 138 that, when executed by a processor, allow the meeting organizer may schedule a day and time for a meeting (e.g., scheduler 138) and invite attendees (e.g., other participants) via email (e.g., email 136). Once the meeting is setup, the moderator and/or the meeting scheduling service 118 may communicate with the other participants (e.g., Participant B through Participant N, etc.) via email and/or through a calendar application to inform the other participants of the meeting details, obtain responses, and update attendance status, etc. In some embodiments, the meeting scheduling service 118 may determine an availability of one or more of the participants prior to scheduling the conference meeting.

The conferencing server 116 may comprise conferencing resources, such as the audio/video bridge service 124 and/or the instant messaging service 128, that can allow two or more conference client devices 108A-N to participate in a conference meeting. One example of a conference meeting includes, but is not limited to, a web-conference communication session established between two or more users/parties, webinars, meetings, and the like. Although some embodiments of the present disclosure are discussed in connection with conference meetings, embodiments of the present disclosure are not so limited. Specifically, the embodiments disclosed herein may be applied to one or more of audio, video, multimedia, conference calls, web-conferences, combinations thereof, other collaborative communication sessions, and/or the like.

In some embodiments, the conferencing server 116 can include one or more resources such as conference mixers and other conferencing infrastructure. As can be appreciated, the resources of the conferencing server 116 may depend on the type of conference meeting or communications provided by the conferencing server 116. Among other things, the conferencing server 116 may be configured to provide conferencing of at least one media type between any number of participants. The conference mixer of the conferencing server 116 may be assigned to a particular communication session for a predetermined amount of time. In one embodiment, the conference mixer may be configured to negotiate codecs with each conference client devices 108A-N participating in the conference meeting. Additionally or alternatively, the conference mixer may be configured to receive inputs (at least including audio inputs) from each participating conference client device 108A-N and mix the received inputs into a combined signal which can be monitored and/or analyzed by the conferencing server 116.

The AI-bot service 120 may comprise one or more components that are capable of instantiating an AI-bot in a conference meeting, determining when queries are made by participants in the conference meeting that may require SME consultation, sending queries to one or more SME client devices 112A-N, and posting responses to the queries (e.g., received from at least one of the SME client devices 112A-N) to the participants in the conference meeting. All of the actions of the AI-bot service 120 may be performed automatically, without human interaction, and without requiring SMEs and participants to communicate with one another. Among other things, the AI-bot service 120 allows the participants in the conference meeting to continue with a conference meeting while the AI-bot retrieves responses to queries without interruption to the conference meeting and without requiring an SME to be a part of the conference meeting. The term "AI-bot," as used herein may correspond to the software and/or instructions characterized as a virtual non-human entity that performs the functions and methods associated with one or more components of the AI-bot service 120 and the in-meeting query assistance.

In some embodiments, the AI-bot service 120 may comprise an AI/machine learning ("ML") engine 140, a natural language processing unit 144, and a speech recognition engine 148. The AI/ML engine 140 is described in greater detail in conjunction with FIG. 2A.

The natural language processing unit 144 may comprise software and instructions that, when executed by a processor, are configured to automatically interpret speech or text received from participants in a conference meeting and/or from SMEs 114 in a separate communication session, determine a weighted meaning of the interpreted speech or text, and take action (e.g., communicate with one or more conference client devices 108A-N as part of the conference meeting, communicate with one or more SME client devices 112A-N outside of the conference meeting, update historical responses, update SME candidate selections, etc.) based on the determined weighted meaning. The natural language processing unit 144 may work in conjunction with the AI/ML engine 140 of the AI-bot service 120.

The speech recognition engine 148 may comprise software and instructions that, when executed by a processor, are configured to automatically convert audio data received from at least one conference client device 108A-N in a conference meeting and/or from at least one SME client device 112A-N in a communication session separate and apart from the conference meeting, into recognized speech. The recognized speech may be stored as text or digital data that is provided by the speech recognition engine 148 to the natural language processing unit 144 and/or other components of the AI-bot service 120. In one embodiment, a participant in the conference meeting may address the AI-bot by saying "hi AI-bot" and then by providing a query following the address such as "what is the status of the tech support line" or "what are the statistics of the customer service group," etc. In this embodiment, the speech recognition engine 148 may convert the audio speech information into recognized text that is provided to the natural language processing unit 144 and/or the AI/ML engine 140 for further processing.

The storage memory 132 may correspond to any type of non-transitory computer-readable medium. In some embodiments, the storage memory 132 may comprise volatile or non-volatile memory and a controller for the same. Non-limiting examples of the storage memory 132 that may be utilized in the conferencing server 116 may include RAM, ROM, buffer memory, flash memory, solid-state memory, or variants thereof. Any of these memory types may be considered non-transitory computer memory devices even though the data stored thereby can be changed one or more times. The storage memory 132 may be used to store information about conference meetings, past queries, past responses to queries, past suggested responses to queries, participants in the conference meetings, SMEs 114, and/or the like. In some embodiments, the storage memory 132 may be used to store rules and/or instructions for one or more components of the AI-bot service 120. For instance, the storage memory 132 may comprise training data that is used to train the AI/ML engine 140 of the AI-bot service 120.

Figure 2A:
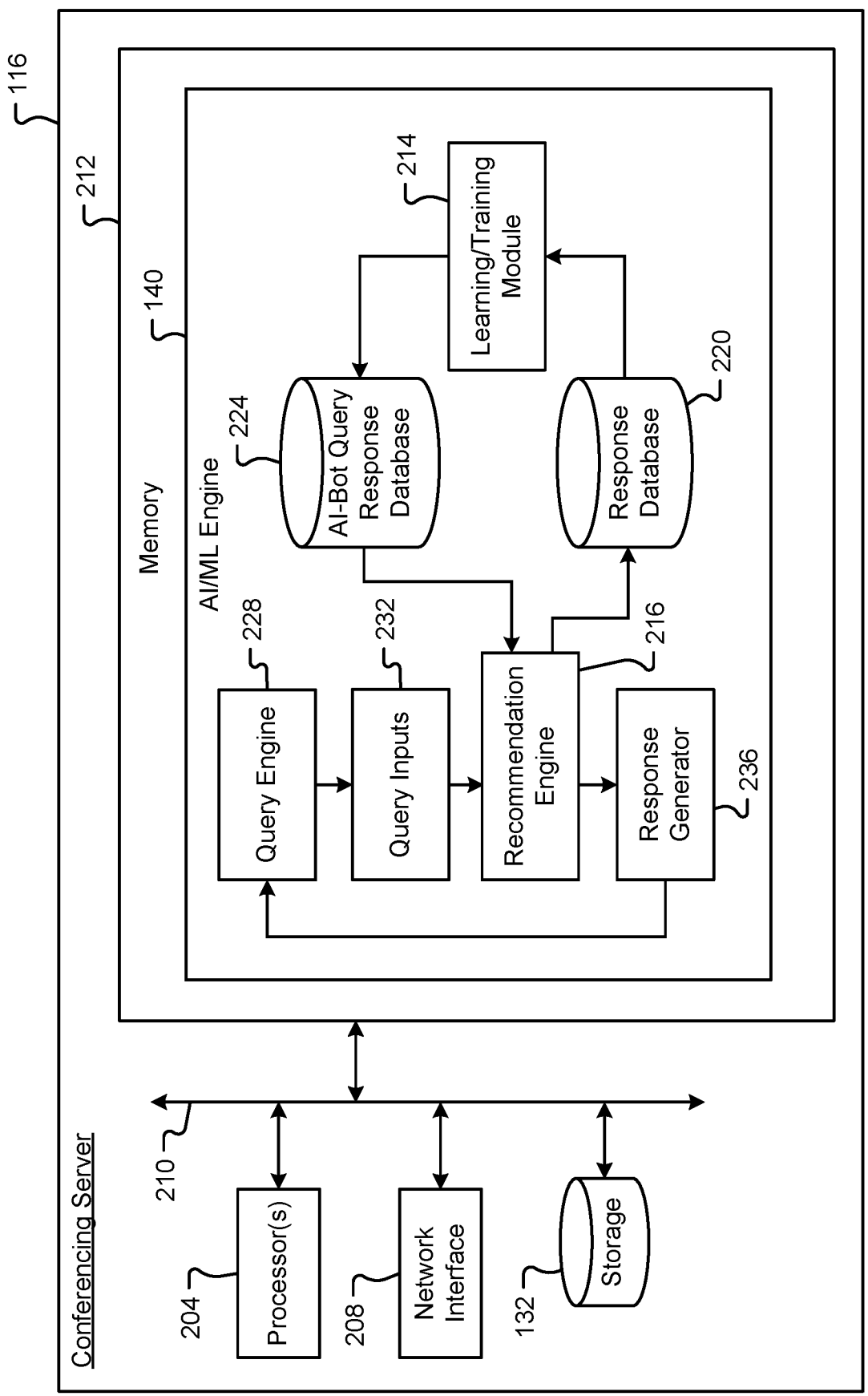
FIG. 2A is a block diagram depicting components of a conferencing server used in a communication system in accordance with at least some embodiments of the present disclosure.

FIG. 2A is a block diagram depicting components of a conferencing server 116 used in the communication system 100 in accordance with at least some embodiments of the present disclosure. The conferencing server 116 is shown to include a computer memory 212 that stores one or more instruction sets, applications, or modules, potentially in the form of an AI/ML engine 140. The conferencing server 116 may be configured as a server, or part of a server, that includes any or all of the components of the conferencing server 116 depicted in FIG. 1. The conferencing server 116 is also shown to include one or more processors 204, and a network communications interface 208, connected to one another via a bus 210. The bus 210 may correspond to a power and/or a communications bus.

The memory 212 may correspond to any type of non-transitory computer-readable medium. In some embodiments, the memory 212 may comprise volatile or non-volatile memory and a controller for the same. Non-limiting examples of memory 212 that may be utilized in the conferencing server 116 may include RAM, ROM, buffer memory, flash memory, solid-state memory, or variants thereof. Any of these memory types may be considered non-transitory computer memory devices even though the data stored thereby can be changed one or more times.

The processor 204 may correspond to one or many computer processing devices. Non-limiting examples of a processor include a microprocessor, an Integrated Circuit (IC) chip, a General Processing Unit (GPU), a Central Processing Unit (CPU), or the like. Examples of the processor 204 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. The processor 204 may be a multipurpose, programmable device that accept digital data as input, processes the digital data according to instructions stored in its internal memory, and provides results as output. The processor 204 may implement sequential digital logic as it has internal memory. As with most microprocessors, the processor 204 may operate on numbers and symbols represented in the binary numeral system.

The network communications interface 208 may comprise hardware that facilitates communications with other communication devices (e.g., the conference client devices 108A-N, and/or the SME client devices 112A-N, etc.) over the communication network 104. In some embodiments, the network communications interface 208 may include an Ethernet port, a Wi-Fi card, a Network Interface Card (NIC), a cellular interface (e.g., antenna, filters, and associated circuitry), or the like. The network communications interface 208 may be configured to facilitate a connection between the conferencing server 116 and the communication network 104 and may further be configured to encode and decode communications (e.g., packets) according to a protocol utilized by the communication network 104.

The AI/ML engine 140 may be configured to operate using a set of guidelines (e.g., as a set of static instructions) or by using machine learning. In some embodiments, the AI/ML engine 140, utilizing machine learning may have access to training data stored in the storage memory 132 to initially train behaviors of the AI/ML engine 140. The AI/ML engine 140 may also be configured to learn from further interactions (e.g., query/response instances, candidate SME selections, etc.) based on feedback, which may be provided in an automated fashion (e.g., via a recursive learning neural network) and/or a human-provided fashion (e.g., by a participant of the conference meeting and/or an SME confirming or denying that a particular selection or suggested response prepared by the AI/ML engine 140 was appropriate for a particular query received from a participant).

A learning/training module 214 of the AI/ML engine 140 may have access to and use one or more conversation models. The conversation models may be built and updated by the training/learning module 214 based on the training data and feedback. The learning/training module 214 may also be configured to access information from a response database 220 for purposes of building an AI-bot query response database 224, which effectively stores AI-bot responses that have been previously provided by the AI/ML engine 140 and have been identified as valid or appropriate under the circumstances (e.g., based on a positive response from a participant, an SME, and/or based on administrative user inputs). Responses within the AI-bot query response database 224 may constantly be updated, revised, edited, or deleted by the learning/training module 214 as the AI/ML engine 140 engages in more interactions with participants of a conference meeting and/or in interactions with queries and responses to queries.

In some embodiments, the AI/ML engine 140 may include a recommendation engine 216 that has access to the AI-bot query response database 224 and selects appropriate suggested response recommendations from the AI-bot query response database 224 based on query inputs 232 received from the natural language processing unit 144 and/or the speech recognition engine 148. In one embodiment, the query engine 228 may provide query inputs 232 to the recommendation engine 216 in the form of real-time chat data and/or in the form of conversation state information. The real-time chat data may correspond to the content of a message received on a chat, or IM, communication channel from one or more conference client devices 108A-N in the conference meeting. In other words, the query engine 228 may be configured to retrieve query message content from a digital communication channel and provide such content to the AI/ML engine 140 in the form of query inputs 232. Using the query inputs 232 and the AI-bot query response database 224, the recommendation engine 216 may be configured to recommend one or multiple responses to a query to a response generator 236. The response generator 236 may be configured to provide a selected suggested response to the query engine 228 for sending on to an appropriate SME or group of SMEs 114 via an appropriate communication channel (e.g., outside of the conference meeting communication session). Stated another way, the query engine 228 may be responsible for managing a state of a query/response interaction and may provide the mechanism by which the AI/ML engine 140 engages with a particular communication channel and a participant of a conference meeting or an SME outside of the conference meeting. For instance, the query engine 228 may produce a message including a suggested response to a query for a chat or audio channel between the AI/ML engine 140 and an SME. As another example, the query engine 228 may post a message including the response to the query from the SME to the chat channel of the conference meeting. Similarly, the query engine 228 may present the response to the query in the form of an audio signal output (e.g., simulated speech, etc.) to the audio channel of the conference meeting that the conference client devices 108A-N of the participants are connected.

The interactions between the AI/ML engine 140 and the participants of the conference meeting as well as the interactions between the AI/ML engine 140 and the SMEs 114 may be determined by the query engine 228, which updates the AI-bot query response database 224. In some embodiments, the AI/ML engine 140 may be configured to interact with participants of the conference meeting in a seamless and uninterrupted manner. For instance, responses to queries may be provided to the conference client devices 108A-N of the participants in the conference meeting via chat, or IM, when the participants are speaking. In some embodiments, the AI/ML engine 140 may not have enough historical information (e.g., in the response database 220 and/or the AI-bot query response database 224) to form a suggested response to a query and may send the query to one or more of the SME client devices 112A-N to provide a response, without a recommendation. In this case, once an SME provides a response to the query, the response may be stored in the response database 220 and the AI/ML engine 140 may update the AI-bot query response database 224 for future like, or similar, queries. In one embodiment, the AI/ML engine 140 may constantly be provided training data from various query/response interactions. In some embodiments, the conferencing server 116 and/or the memory 212 may comprise a plurality of AI/ML engine 140 without departing from the scope of the present disclosure.

Figure 2B:
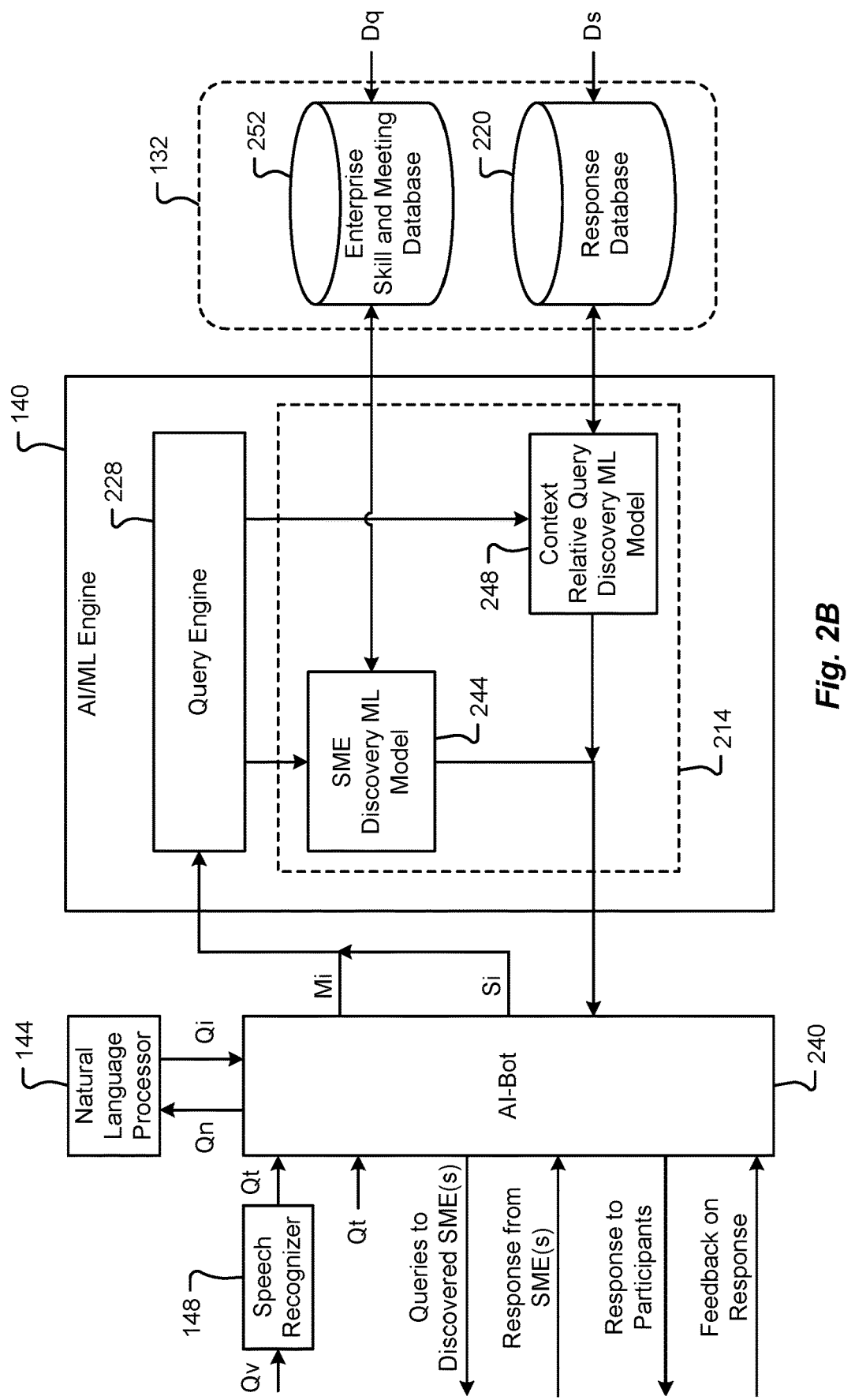
FIG. 2B is a block diagram depicting interactions between components of the conferencing server in accordance with at least some embodiments of the present disclosure.

Referring to FIG. 2B, a block diagram depicting interactions between components of the conferencing server 116 is shown in accordance with at least some embodiments of the present disclosure. As illustrated in FIG. 2B, the AI-bot 240 may be a bot that receives queries from conference meeting participants in a text, $Q_t$, or a voice, $Q_v$, format. When a conference meeting participant posts the query in an IM chat window of the meeting, the AI-bot 240 receives the query in the text format, $Q_t$. When the conference meeting participant posts the query as voice command addressing the AI-bot 240, the voice query is fed into a speech recognition engine 148 to convert the voice query, $Q_v$, into a text query, $Q_t$. The AI-bot 240 reaches out to SME(s) with the query and recommend responses. The AI-bot 240 then receives responses from SME(s) via a preferable communication channel. The AI-bot 240 may post the response from one or more SME(s) to the participants of the conference meeting. In some embodiments, the AI-bot 240 may request and/or receive response feedback from the participants of the conference meeting.

The natural language processing unit 144 may be responsible for processing the query and identifying the intention of the query, entities of the query and a context or topic of the query, $Q_i$. By way of example, a participant of a conference meeting may pose the following query: "What's the average wait time ("AWT") for the tech support team?" As provided above, this voice query, $Q_v$, may be converted into a text query, $Q_t$, by the speech recognition engine 148 and then forwarded to the AI-bot 240. In some embodiments, the AI-bot 240 may convert the text query, $Q_t$, into a query in "natural language," $Q_n$. In this case, the natural language processing unit 144 may process the above query, $Q_n$, and identify: 1) the "tech support team" as the "context/topic," the AWT as "entity," and may find the AWT as "intention." These query identifiers, $Q_i$, may then be provided to the AI-bot 240 and/or the AI/ML engine 140 (e.g., for SME discovery and context relative query response determination, training, etc.).

The AI-bot service 120 may utilize one or more memory devices, databases, or enterprise storage locations as repositories of data for the AI-bot, machine learning, SME(s), performance, conference meeting, and/or other information in the AI-bot assistance methods and systems described herein. In one embodiment, the storage memory 132 may correspond to the enterprise storage and may comprise different databases that store enterprise meeting information (e.g., including meeting participants, meeting date & time, SME(s) details who are preferred by meeting scheduler person for consultation, etc.) and employee profile information (e.g., including SME and/or other employee's communication addresses and their skill set and specialization areas). The SME(s) may be identified based on their specialization skill area(s) stored in the employee profile information. In any event, this meeting and/or employee information may be stored in an enterprise skill and meeting database 252 of the storage memory 132. The data stored in the various databases 220, 252 of the storage memory 132 may be used by AI/ML engine 140 to train and arrive at the best possible SME discovery ML model 244, which is used to discover best SME(s), and determine a context relative query discovery ML model 248 for context relative queries and responses. In some embodiments, the enterprise storage may be fed with SME(s) data, Ds, and historical meeting information and queries, Dq, raised in past meetings. Among other things this data, Ds, Dq, may be used to train and arrive at machine learning models of the AI/ML engine 140.

The AI/ML engine 140 may be responsible for discovering the best SME(s) who are mostly available for consultation and would provide more accurate and swift responses for the queries posted by one or more participants of the conference meeting. Additionally or alternatively, the AI/ML engine 140 may be responsible for finding the context or topic related historical query responses which would be provided as suggested responses to SME(s), thereby helping the SME(s) to answer queries quickly. In some embodiments, the AI/ML engine 140 may comprise the query engine 228, the SME discovery ML model 244, and the context relative query discovery ML model 248.

The query engine 228 may correspond to a query and feedback data processor. The query engine 228 may be the receiver of the meeting, query, and feedback data from the AI-bot 240. The meeting identification, intents, entities, context, may correspond to meeting input parameters, Mi, while the SME identification, SME feedback metrics, query responses and feedback may correspond to SME-related input parameters, Si. The query engine 228 may further divide these input parameters, Mi, Si, and feed various combinations of the divided input parameters to the SME discovery ML model 244 and the context relative query discovery ML model 248, as needed.

When a query is posted to the AI-bot 240 by a participant in the conference meeting, the query engine 228 may receive from the AI-bot 240 the meeting identification of the current conference meeting, the context or topic to which the query is associated, the intentions of the query, and the entities present in query.

When a response to the query is received from an SME and presented to the participants of the conference meeting the query engine 228 may receive from the AI-bot 240 the meeting identification of the current conference meeting, the context or topic to which the query is associated, the response to the query, feedback from a participant on the accuracy or usefulness of the response to the query, and/or SME feedback metrics such as swiftness of SME in responding to a posted query, the availability of an SME for the conference meeting duration, and/or an accuracy or usefulness of the response provided by SME.

The SME discovery ML model 244 may discover the best SME(s) who can provide quick and more accurate responses for the queries posted to them (e.g., when compared to other SME(s) who may be selected and/or available, etc.). The SME discovery ML model 244 may be trained using either real historical or synthesized SME data. In some embodiments, this training data may be fed into the storage memory 132, or enterprise storage. Among other things, the SME discovery ML model 244 analyzes the data of SME(s), discovers best SME(s) based on the analysis, and recommends the discovered best SME(s) to the AI-bot 240. These recommended SME(s) may be used by the AI-bot 240 to post queries (e.g., requests for responses to the queries).

The context relative query discovery ML model 248 may correspond to a model that finds past queries, which may be related to the topic or context of the current posted query (e.g., the query posted in the current conference meeting, etc.). The historical queries and their associated responses may be used to train and design the context relative query discovery ML model 248. This historical data may be actual historical data or synthesized data. In some embodiments, the context relative query discovery ML model 248 analyzes the query responses of SME(s) and their accuracy feedback provided by participants of conference meetings. Based on the analysis, the context relative query discovery ML model 248 learns the query response suggestions, which may be recommended to SME(s) when a related query is posted by a participant of a conference meeting.

In some embodiments, the learning/training module 214 may comprise the SME discovery ML model 244 and/or the context relative query discovery ML model 248.

Figure 3:
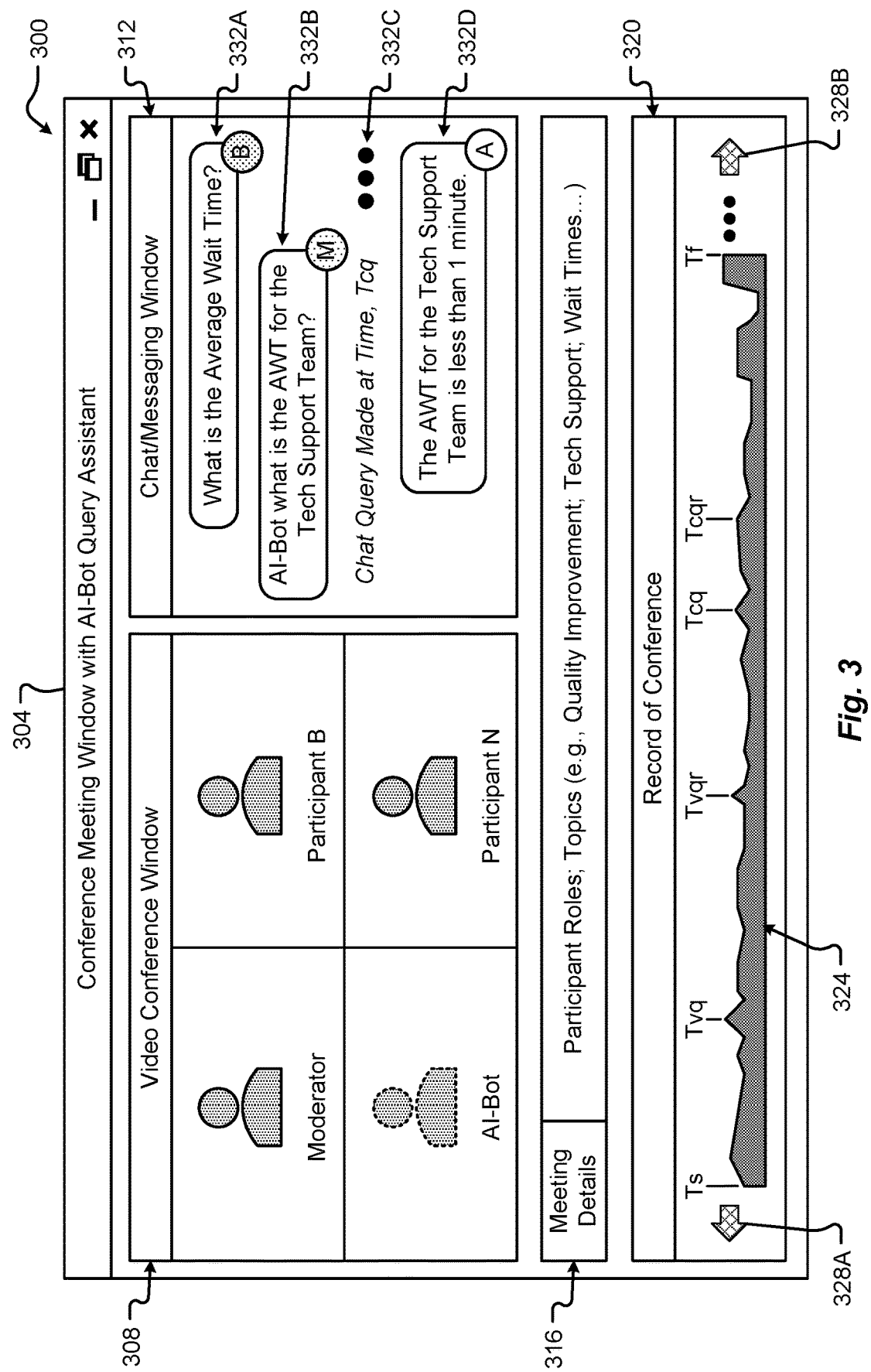
FIG. 3 is a block diagram depicting a conference meeting user interface in accordance with at least some embodiments of the present disclosure.

FIG. 3 is a block diagram depicting a conference meeting user interface 300 in accordance with at least some embodiments of the present disclosure. The conference meeting user interface 300 may include a window 304 that can be presented to a display of at least one conference client device 108A-N. The window 304 may include identification information, application controls, and at least one viewing area. The viewing area of the window 304 may be separated into a number of different areas 308, 312, 316, 320. In particular, the window 304 may include a video conference display area 308, a messaging display area 312, a meeting details display area 316, and/or a conference record window 320.

The video conference display area 308 may include a display area that presents video information of participants in a conference meeting. In some embodiments, the video conference display area 308 may be used to share live images of files, documents, presentations, slides, images, and/or video streams. The images may be provided by an audio/video bridge service 124 as described in conjunction with FIG. 1. As shown in FIG. 3, the video conference display area 308 includes images of each participant in the conference meeting. Although the AI-bot 240 is a non-human virtualization that is a part of the conference meeting, the AI-bot 240 may be represented by a still image, moving image, or avatar in the video conference display area 308. In one embodiment, a display of information shown in the video conference display area 308 may be selectively controlled by a moderator (e.g., via the moderator's first conference client device 108A, etc.), the AI-bot 240 (e.g., enabled by the AI-bot service 120, etc.), the conferencing server 116, or some other participant of the conference meeting (e.g., via conference client devices 108B-108N, etc.). In the case of certain presentations and/or conferences (e.g., interactive communications, webinars, presentations, etc.), the video conference display area 308 may include playback controls, audio controls, video controls, and/or other content controls.

The messaging display area 312 may include a display area that presents text chat information of the conference meeting. The messaging display area 312 may be configured to display text messages sent across the chat channel as part of the instant messaging service 128. In one embodiment, chat messages may be provided by one or more participants and/or the AI-bot 240 in the conference meeting. Chat messages may be identified with a participant identifier. As shown in FIG. 3, the first chat communication 332A is a question from Participant B (e.g., provided via the second conference client device 108B on the chat channel of the conference meeting), identified with a letter "B." The second chat communication 332B is from the Moderator (e.g., provided via the first conference client device 108A on the chat channel of the conference meeting), identified with a letter "M." The third chat communication 332C identifies that a query has been made in the messaging display area 312. This identification of a query may be made by the AI/ML engine 140 determining a query has been asked in the conference meeting. Once the AI/ML engine 140 determines a response to the query (e.g., by obtaining a response to the query from an SME, etc.), the AI-bot 240 may provide the fourth chat communication 332D posting the response to the messaging display area 312. The fourth chat communication 332D is from the AI-bot 240 (e.g., via the AI/ML engine 140, etc.) and is identified with a letter "A." Although identified with letters in FIG. 3, it should be appreciated that any identifier (e.g., color-coding, name, style, typeface, font, size, combinations thereof, etc.) may be used to differentiate one communication from another in the messaging display area 312.

As shown in the messaging display area 312, the moderator (e.g., a participant of the conference meeting including the AI-bot 240) addresses the AI-bot 240 and raises a query (e.g., second chat communication 332B). The address is the phrase "AI-bot" and the query relates to the AWT for the tech support team. The AI/ML engine 140 may determine that the query has been raised based at least part on the address and the nature of the query content. In some embodiments, the AI/ML engine 140 may determine that a query has been raised based on training, past queries raised, and/or any combination of information disclosed herein. In any event, the AI/ML engine 140 shows that the query has been received by presenting an acknowledgement of the query in the third chat communication 332C. In response to receiving the query, the AI/ML engine 140 may communicate with an SME and request a response to the query while the conference meeting is in progress. In some embodiments, the AI/ML engine 140 may determine a suggested response to the query that is communicated (e.g., sent across the communication network 104) to the SME. The SME may select to accept the suggested response or decline to use the suggested response. If the SME declines to use the suggested response, the SME may type, text, or speak a response to the query via the SME's respective client device 112A-N. Once the AI/ML engine 140 receives the response to the query, the AI/ML engine 140 may post the response to the query in the messaging display area 312 for participants of the conference meeting to read. This posted response may correspond to the fourth chat communication 332D, as provided above.

In some embodiments, the window 304 may include a meeting details display area 316 that identifies at least one of a meeting topic, name, agenda, participant list, expected topics for discussion, combinations thereof, and/or the like. Although shown in the window 304 of FIG. 3, the meeting details and/or associated content may be stored in metadata with the conference meeting (e.g., at the meeting scheduling service 118, the conferencing server 116, and/or in the storage memory 132, etc.). The content of the meeting details may be used by the AI/ML engine 140 in determining an appropriate SME or group of SMEs 114 to select for a particular query or conference meeting. Additionally or alternatively, the content of the meeting details may be used by the AI/ML engine 140 to determine a suggested response to a query that the AI-bot 240 can provide to the selected SME or group of SMEs 114 to allow faster responses to the queries from the SME or group of SMEs 114.

The window 304 may include a conference record window 320 that tracks, or records, events in a conference meeting. The conference record window 320 may record audio, video, and/or chat communications that are part of the conference meeting. The conference record window 320 may include a conference communications time recording 324 running from a start time, Ts, of the conference meeting and proceeding until an end, or finish time, Tf, of the conference meeting. The conference communications time recording 324 may record audio (e.g., amplitude and frequency, spoken words or phrases, etc.) and may even differentiate between conversation as part of the conference meeting and queries made in the conference meeting. For instance, the conference communications time recording 324 is shown as indicating different points in time (e.g., between the start time, Ts, and finish time, Tf) when a query was raised. As illustrated in FIG. 3, a voice query (e.g., made by a participant over the audio channel of the conference meeting) was raised at a first voice query time, Tvq. The conference communications time recording 324 shows that the AI-bot 240 presented a response at a first response to voice query time, Tvqr. At a point later in the conference meeting, a chat query (e.g., made by a participant over the chat channel of the conference meeting) was raised at a first chat query time, Tcq. The conference communications time recording 324 shows that the AI-bot 240 presented a response to the first chat query at a first response to chat query time, Tcqr. Although shown in the window 304 of FIG. 3, the conference communications time recording 324 and/or associated content may be stored in metadata with the conference meeting (e.g., at the meeting scheduling service 118, the conferencing server 116, and/or in the storage memory 132, etc.). The content of the conference communications time recording 324 may be used by the AI/ML engine 140 in determining an appropriate SME or group of SMEs 114 to select for a particular query or conference meeting in future query/response interactions. For example, the time between raising a query and obtaining a response to a query may be used by the AI/ML engine 140 to improve SME selection, response to query suggestions/recommendations, and/or updating the AI-bot query response database 224. As another example, the number of queries raised in a particular conference meeting having a specific combination of participants may be used to determine an appropriate SME or group of SMEs 114 to select for a particular query or conference meeting in future query/response interactions including that specific combination of participants. In this example, the AI/ML engine 140 may determine, or learn, that the specific combination of participants, when together in a conference meeting, raise more queries than other combinations of participants in conference meetings. Accordingly, when the specific combination of participants are scheduled for a conference meeting, the AI/ML engine 140 may determine to send queries to a group of SMEs 114 including a greater number of SMEs than when the combination of participants in a conference meeting does not include the specific combination of participants. Conversely, when the specific combination of participants are determined to raise fewer queries when in a conference meeting together, the AI/ML engine 140 may determine to send queries to a group of SMEs 114 including a fewer number of SMEs than when the combination of participants in a conference meeting does not include the specific combination of participants.

The conference record window 320 and/or any other display area 308, 312, 316 may comprise various navigation, scrolling, and/or modification controls. As shown in FIG. 3, the conference record window 320 comprises conference record controls 328A-B that allow a participant to select an icon, via a user interface of a conference client device 108A-N, and move among the conference communications time recording 324, or navigate other portions of the conference record window 320. In one embodiment, selection of the first conference record control 328A may show an earlier time portion of the conference communications time recording 324 in the conference record window 320. Additionally or alternatively, selection of the second conference record control 328B may show a later time portion of the conference communications time recording 324 in the conference record window 320.

Figure 4:
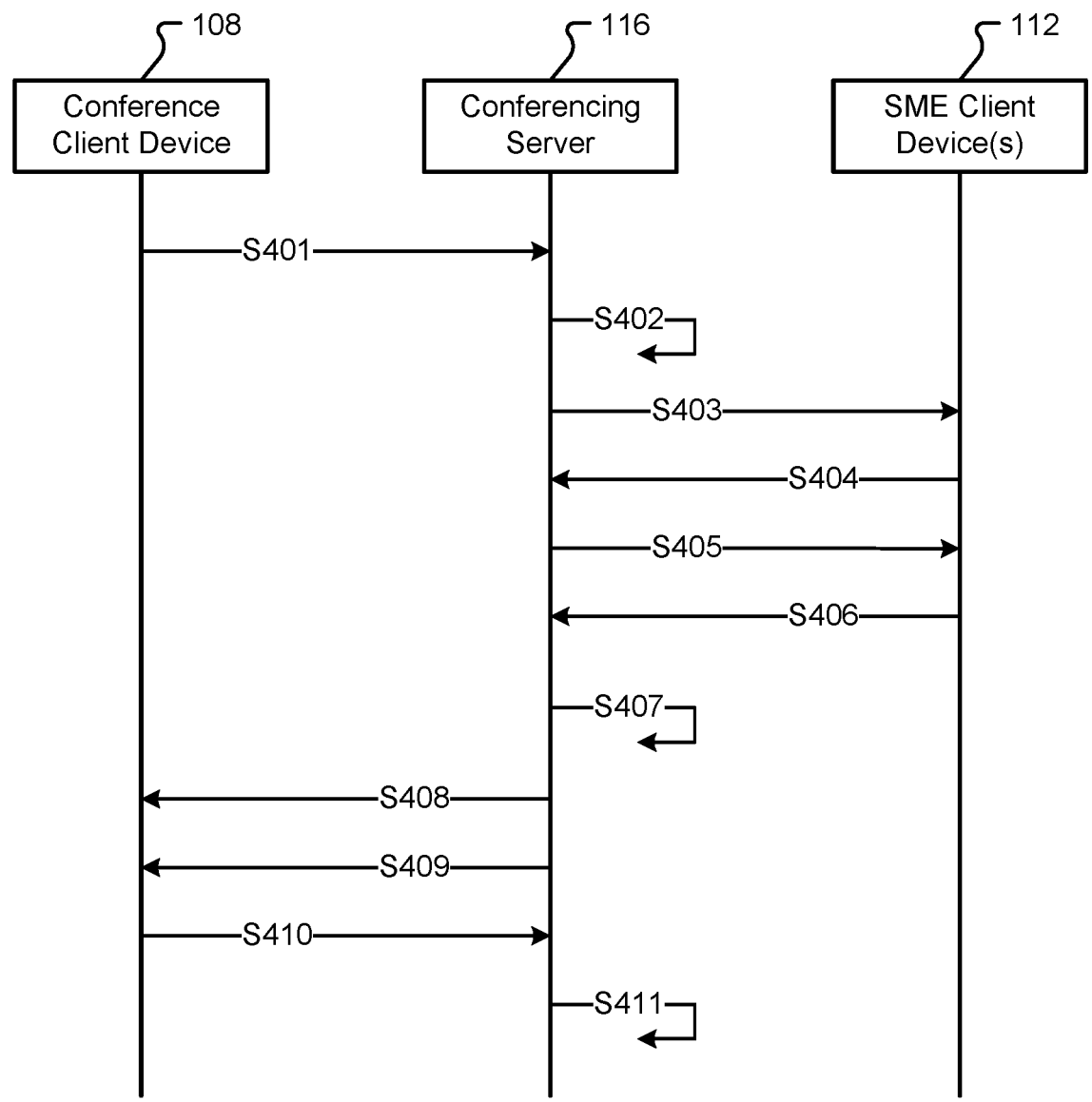
FIG. 4 is a diagram depicting a set of communication flows in accordance with at least some embodiments of the present disclosure.

With reference now to FIG. 4, a set of communication flows will be described in accordance with at least some embodiments of the present disclosure. The communication flows begin when a conference client device 108 of a participant in a conference meeting raises a query (step S401). In some embodiments, the query may be automatically detected by the conferencing server 116 in response to monitoring audio and text communications between participants in the conference meeting. For instance, the AI/ML engine 140 in conjunction with the natural language processing unit 144 and/or the speech recognition engine 148 may determine that a phrase, set of keywords, silence (e.g., absence of words), and/or combinations thereof, in a conference meeting is associated with a query. This monitoring of speech (e.g., over an audio channel of the audio/video bridge service 124) and/or text (e.g., over a chat channel of the instant messaging service 128, etc.) in the conference meeting may be referred to herein as "listening" by the AI-bot 240 (e.g., via the AI-bot service 120, etc.). In one embodiment, the communication flows begin when a conference client device 108 identifies a question raised as a query (e.g., by addressing the AI-bot 240 and/or by providing a query phrase). In any event, the conferencing server 116 and, more specifically, the AI-bot service 120 of the conferencing server 116 receives the query.

Upon receiving the query, the conferencing server 116 may process the query to determine, or extract, appropriate SME consultation information and potential recommended, or suggested, responses to the query (step S402). In particular, the natural language processing unit 144 and/or the speech recognition engine 148 may determine combinations of words used in the query, determine an originator of the query (e.g., which participant raised the query, etc.), and provide the determined information to the AI/ML engine 140 for further processing. The AI/ML engine 140 may proceed by determining whether the combination of words associated with the query (e.g., provided before the query or as part of the query, etc.), the originator of the query (e.g., the identification of the participant that raised the query, etc.), includes decision information such as particular topics, phrases, or other keywords associated with SME consultation selection. This decision information may be analyzed by the AI/ML engine 140 to select a particular SME or group of SMEs 114 for consultation. In some embodiments, the selection may include determining which SMEs 114 have the technical expertise (e.g., skills, attributes, etc.) and are available to provide a response to a query. The decision information may be used to determine a suggested response to the query (e.g., to provide to the SME for fast handling of the query) based on historical responses (e.g., responses in the response database 220 and/or in the AI-bot query response database 224, etc.) as described in conjunction with FIG. 2A.

In step S403, the conferencing server 116 may determine an availability of the SMEs considered by the AI/ML engine 140 as candidate SMEs for selection. While this step may be performed before the conference meeting, or at the time the conference meeting begins, it should be appreciated, that the AI/ML, engine 140 may determine availability at any time during a conference meeting. In one embodiment, the AI/ML engine 140 may determine an availability in response to determining a query has been raised and before sending a message to a particular SME to response to the query. Availability may be based on send an IM presence, indicated calendar availability (e.g., via a status request message sent to the meeting scheduling service 118, etc.), an interactive ping IM (e.g., sent from the conferencing server 116 to a SME client device 112 of the SME, etc.), and/or other availability status indicators. As illustrated in FIG. 4, the conferencing server 116 sends an interactive ping IM to the SME client devices 112 of one or more SMEs 114.

Upon receiving the interactive ping IM, each SME client device 112 may provide an availability status response (step S404). The availability status response may be sent automatically by the SME client device 112 in response to receiving the interactive ping IM. In some embodiments, an SME may be required to provide an availability in response to receiving the interactive ping IM. For example, the interactive ping IM may include a plurality of preset availability options from which the SME may select, such as "Available," "Unavailable," "Available at a Time," "Unavailable until a Time," and/or other interactive options or variations thereof. When the SME provides a selection via the user interface of the SME client device 112, the selection is sent to the conferencing server 116 and the AI/ML engine 140 may determine to include the responding SME as a candidate for consultation or remove the responding SME as a candidate for consultation. When an SME fails to respond to the interactive ping IM, the AI/ML engine 140 may determine, after a predetermined time, that the SME is unavailable and remove the unresponsive SME from consideration as a candidate for consultation.

In some embodiments, the conferencing server 116 sends a message to an SME client device 112 associated with an available SME include a request for the SME to provide a response to the query raised (step S405). The message may be sent as an audio message over an audio communication channel between the conferencing server 116 and the SME client device 112. In some embodiments, the message may be sent as a text, or chat, message over a chat communication channel between the conferencing server 116 and the SME client device 112. The message may be sent to one or more of the group of SMEs 114 (e.g., via their respective SME client devices 112A-N, etc.). The message may comprise the suggested response determined by the AI/ML engine 140 (e.g., at step S402).

When the message is a sent as an audio message, the suggested response may be spoken to the SME, via the conferencing server 116, as a selectable option (e.g., over an audio channel separate from the conference meeting). For instance, the message may state, using a speech synthesizer or other text-to-speech system, "the query asked is what is the AWT of the tech support team," and "AI-bot found the last recorded AWT for the tech support team to be less than one minute, if you would like to accept this suggested response as the official response to the query, please press or say '1' now, otherwise, please press or say '2' and record your different response to the query." In this case, the SME may determine that the suggested response is correct and then press or say "1" via the SME client device 112.

However, if the SME determines that the suggested response is incorrect, the SME may press or say "2" via the SME client device 112 and record a different response in a reply to be processed by the conferencing server 116.

When the message is sent as a text-based message (e.g., via chat, IM, email, or other text-based communication), the query and the suggested response may be provided to a display device of the SME client device 112 in a text format. The message may allow the SME to accept the suggested response by selection, text response, or the like, via the SME client device 112. Additionally or alternatively, the message may allow the SME to provide a different response to the query by entering a text response to the query via the SME client device 112.

Whether the response to the query is provided by the SME via text or audio, the response to the query (e.g., replying to the message sent from the conferencing server 116) is sent to the conferencing server 116 across a communication network 104 via a network communications interface 208 (step S406).

Upon receiving the response to the query from the SME client device 112, the AI-bot service 120 of the conferencing server 116 may process the response for presenting to the conference meeting (step S407). In some embodiments, the query may be raised over a first communication channel (e.g., either audio or chat) as part of the conference meeting. The conferencing server 116 may send the message including the query to the SME client device 112 as an audio message, a text-based message, and/or to multiple SME client devices 112 as different messages (e.g., audio, chat, IM, text, email, etc.). Although the conferencing server 116 may receive different formats (e.g., audio or text) of responses to the query, the conferencing server 116 may determine to provide the response to the query in the same format in which it was raised. When the query is raised in the form of speech (e.g., over the audio channel of the audio/video bridge service 124), the AI/ML engine 140 may process the received responses to queries to provide the response to the conference meeting as a synthesized speech response over the audio channel of the audio/video bridge service 124. Additionally or alternatively, when the query is raised as a text entry (e.g., over the chat channel of the instant messaging service 128), the AI/ML engine 140 may process the received responses to queries to provide the response to the conference meeting as a text entry (e.g., the fourth chat communication 332D, etc.) over the chat channel of the instant messaging service 128. In some embodiments, regardless of the query format in the conference meeting and/or the response to query format received by the conferencing server 116, the conferencing server 116 may provide the responses to the queries in text format.

In some embodiments, the AI/ML engine 140 may, depending on the response to the query received, update the responses in the response database 220 and/or the AI-bot query response database 224, and/or train one or more of the recommendation engine 216, the query engine 228, and the response generator 236 at step S407. This update and/or training may be performed, at least in part, by the learning/training module 214 of the AI/ML engine 140. The training of the AI/ML engine 140 (based on the response to the query received, etc.) may allow the recommendation engine 216 to provide better (e.g., more accurate) suggested responses to queries to the SMEs 114 in future messages.

As illustrated in FIG. 4, the response to the query is provided by the conferencing server 116 to the conference meeting in step S408. Providing the response to the query may comprise causing the AI-bot 240 to present the response to the query to the plurality of connected conference client devices 108 on behalf of the subject matter expert(s) 114 without requiring the subject matter expert to be included in the conference meeting. In FIG. 4, no communications exist between the conference client device 108 and the SME client device 112, or vice versa, without processing and analysis by the conferencing server 116. Among other things, these restricted communication flows allow conference participants to continue a meeting while the conferencing server 116 receives queries, obtains responses, and presents the responses to the conference meeting without ever including an SME in the conference meeting. Benefits of keeping SMEs 114 separate from the conference meeting include, but are in no way limited to, an enhanced security of associated with the conference meeting (e.g., by ensuring only the necessary and/or appropriately privileged participants are able to connect to the conference meeting, etc.), an efficient use of SMEs 114 (e.g., only using SMEs 114 when necessary by requesting a response from the SME when a query is raised, etc.), and an efficient use of time in a conference meeting (e.g., by allowing queries to be raised and answered automatically and without delays associated with participants attempting to obtain responses during the meeting).

In some embodiments, after providing a response to a query, the conferencing server 116 may request feedback from one or more participants of the conference meeting regarding an accuracy of the response to the query. This feedback request may be sent as a message from the conferencing server 116 and/or some other component in the communication system 100 (step S409).

The participants may provide feedback in the form of a message sent from a respective conference client device 108 to the conferencing server 116 (step S410). Upon receiving the message, and based on the feedback, the AI/ML engine 140 may update the responses in the response database 220 and/or the AI-bot query response database 224, and/or train one or more of the recommendation engine 216, the query engine 228, and the response generator 236 (step S411). This update and/or training may be performed, at least in part, by analyzing the feedback, determining that a response to a query previously provided was accurate, inaccurate, off-topic, provided quickly, provided with a significant delay, acceptable, unacceptable, resulted in fewer follow-up queries, resulted in a greater number of follow-up queries, and/or the like. The training of the AI/ML engine 140, based on the feedback, may allow future SME selections (e.g., for consideration as candidates for consultation) to provide better and/or quicker responses. Additionally or alternatively, the training of the AI/ML engine 140 (based on the feedback, etc.) may allow the recommendation engine 216 to provide better (e.g., more accurate) suggested responses to queries to the SMEs 114.

The communication flows of FIG. 4 may repeat each time a query is raised by at least one participant in a conference meeting.

Figure 5:
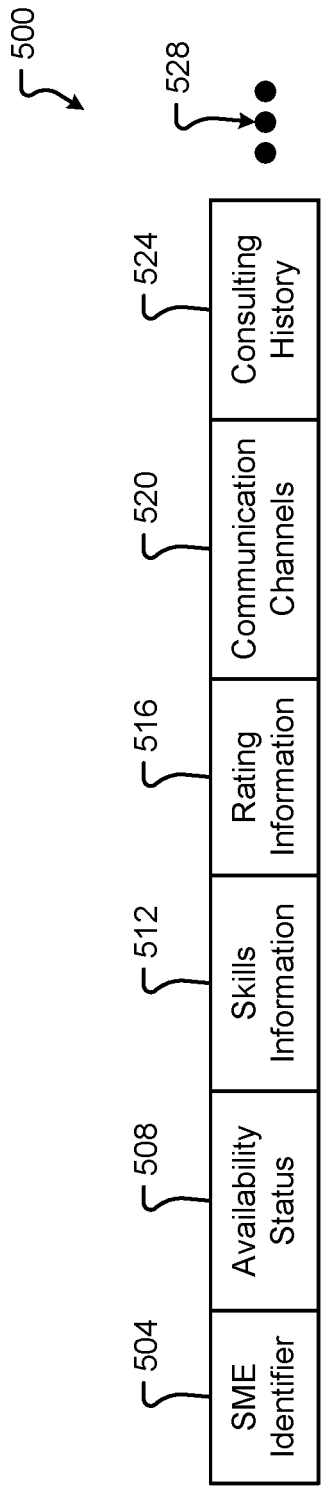
FIG. 5 is a block diagram depicting a subject matter expert data structure used in accordance with embodiments of the present disclosure.

Referring to FIG. 5, a block diagram depicting an SME data structure 500 will be described in accordance with at least some embodiments of the present disclosure. The SME data structure 500 may include a number of fields that may be used in the various communication flows, methods, and processes outlined herein. For instance, it is anticipated that the SME data structure 500 shown may be associated with determining candidate SMEs for consideration in consulting for the in-meeting instant query assistance methods performed by the conferencing server 116. In particular, the SME data structure 500 depicted includes a plurality of data fields that contribute, at least in part, to the process of determining candidate SMEs for selection when requesting responses to queries raised in a conference meeting. Examples of such data fields include, without limitation, a SME identifier field 504, an availability status field 508, a skills information field 512, a rating information field 516, a communication channels field 520, a consulting history field 524, and more 528.

The SME identifier field 504 may comprise data used to identify or describe a particular SME and/or SME client device 112 that is, or was, a part of the communication system 100. This identification may be a name, phrase, word, symbol, number, character, and/or combination thereof. In some embodiments, the identification in the SME identifier field 504 may correspond to a particular device identification, media access control ("MAC") address, IP address, hardware identification, etc., and/or combinations thereof associated with the SME client device 112 of an SME. In some embodiments, the SME identifier field 504 may be used to one or more of order, rank, differentiate between SME client devices 112A-N of SMEs 114.

The availability status field 508 may comprise data used to identify an availability of an SME at a given period of time. The availability status field 508 may include a current availability and/or an availability for one or more times. The information stored in the availability status field 508 may indicate that an SME is available, unavailable, busy, or away from the SME client device 112, and/or combinations thereof. The AI/ML engine 140 may determine to include or exclude an SME as a candidate for consultation consideration based on the information in the availability status field 508. In some embodiments, the information in the availability status field 508 may be based on an IM presence, communication session presence, calendar availability, user (e.g., SME) setting, and/or the like. In one embodiment, the availability information in the availability status field 508 may be determined in response to the conferencing server 116 requesting an availability status of the SME client device 112.

The skills information field 512 may comprise one or more bits or bit values that identify any skills and/or attributes associated with an SME in the group of SMEs 114. In some embodiments, the conferencing server 116 or its various components (e.g., the AI-bot service 120, etc.) may utilize information contained in the skills information field 512 to match an SME with request for a response to a query. For instance, at least one of the skills stored in the skills information field 512 may be used by the AI-bot service 120 in determining candidate SMEs that should receive messages requesting responses to queries. The skills information field 512 may comprise information that defines types of skills and/or types of attributes associated with a particular SME. Types of attributes may include, but are in no way limited to, language attributes (e.g., English, Spanish, etc.), group/team assignment attributes (e.g., one or more teams or groups the SME works in, with, or for, such as the tech support team, etc.), areas of specialty (e.g., performance metrics, statistics, quality, etc.), and an SME rating (e.g., expert, expert-mentor, expert-group-leader, etc.). The AI/ML engine 140 may determine, for example, based on at least one of a topic of a conference meeting, attendees in the conference meeting, and/or the content of a query raised in the conference meeting to select one or more candidate SMEs who may be selected for consultation while the conference meeting is in progress. For example, the AI/ML engine 140 may determine based on this information that SMEs selected or considered for consultation have the following required skills or attributes: "Tech Support Team," and "Performance Statistics." The AI/ML engine 140 may also prefer those SMEs who also have the attributes: "Spanish" and "Expert Group Leader." In any event, in response to determining matching SMEs having the required and/or preferred attributes, the conferencing server 116 may send a message to the matching SMEs that they may be consulted by the AI-bot 240 during the conference meeting.

The rating information field 516 may be used to store data about a rating of a particular SME. For example, the rating information field 516 may include, but is not limited to, prior query response performance, speed in responses to past queries, accuracy in responses to past queries, peer rating, supervisor rating, feedback rating, overall rating value, combinations thereof, and the like. The overall rating value may combine one or more of other ratings to define a status for the SME in query/response interactions. For example, a highly rated SME may have a "gold" or a "platinum" rating value, while lower rated SMEs may have a "silver" or "bronze" rating value. In one embodiment, a "platinum" rated SME may provide quick responses (e.g., in less than 2 minutes, etc.) with an average accuracy in response quality greater than a predetermined accuracy threshold (e.g., an accuracy of responses, based on participant feedback, etc., of greater than 95%). In one embodiment, a "platinum" rated SME may provide quick responses (e.g., responding in less than 1 minute, etc.) with an average accuracy in response quality greater than a predetermined accuracy threshold (e.g., an accuracy of responses, based on participant feedback, etc., of greater than 95%). A "gold" rated SME may provide relatively quick responses (e.g., responding in less than 2 minutes, etc.) with an average accuracy in response quality greater than a different predetermined accuracy threshold (e.g., an accuracy of responses, based on participant feedback, etc., of greater than 85%). A "silver" rated SME may provide slow responses (e.g., responding in more than 5 minutes, etc.) with a high degree of average accuracy in response quality (e.g., an accuracy of responses greater than 98%). However, in this case, the SME may be rated lower than other SMEs because the time to respond to queries is slow compared to the other SMEs. As can be appreciated, SMEs having "platinum" or "gold" rating values may be selected and/or considered for consultation by the AI/ML engine 140 before other, lower rated, SMEs.

Depending on the importance of the response to the query, the ratings of SMEs may be valued differently. For instance, when a query needs a highly-accurate response and timeliness of the response is not important, the AI/ML engine 140 may select an SME having the higher accuracy in responses regardless of time to respond. This need of accuracy may be expressed in the content of the query. For example, a participant may provide "we need this number to be as close to correct as possible" and/or "it doesn't matter how long it takes, we just need to get it right." In this case, the AI/ML engine 140 may determine to select SMEs with higher accuracy ratings. In some embodiments, SMEs may have a rating value of "platinum" for response quality and accuracy, but have a rating value of "bronze" for timeliness in responding, or vice versa. Depending on the content of the query, the AI/ML engine 140 may select an SME as a candidate for responding to the query having the highest rating for a particular need and/or select the highest average rating for a number of needs.

The communication channels field 520 may be used to store data about available communication channels associated with a particular SME. This data may include whether the SME identified in the SME identifier field 504 can receive audio communications (e.g., over an audio channel, etc.), text communications (e.g., over a chat channel, etc.), and/or combinations thereof. In some embodiments, the information in the communication channels field 520 may define the best reachable, or most reliable, communication channel for the SME. For instance, an SME may not always be available via the audio communication channel but may reliably respond to text communications sent over the chat communication channel. In this instance, the chat communication channel would be identified in the communication channels field 520 as the most reliable communication channel. The communication channels field 520 may indicate one or more of a preferred communication channel, a most reliable communication channel, restricted or unavailable communication channels, and/or the like.

The consulting history field 524 may be used to store data about past query/response interactions and other consulting history between an SME and the AI/ML engine 140. This information may include, but is in no way limited to, accuracy of past responses to queries submitted by the SME (e.g., based on feedback, evaluation, number of follow-up or clarification queries, etc.), swiftness in responding to past queries (e.g., the time between when a message was sent by the AI/ML engine 140 to the SME requesting a response to a query and the time when the SME provided a response to the query, etc.), and an availability of the SME during meeting durations (e.g., whether the SME agreed to be available and then failed to respond to a query, delayed in responding to a query, and/or changed availability from "free" to "busy" etc. during the conference meeting duration). In some embodiments, the consulting history field 524 may comprise an identification of past conference meetings in which the AI/ML engine 140 has consulted the SME, a number of past conference meetings in which the AI/ML engine 140 has consulted the SME, conference meeting agendas and/or topics for which the AI/ML engine 140 has consulted the SME, and/or the like. The information stored in the consulting history field 524, like the information stored in any and/or all fields of the SME data structure 500, may be used by the AI/ML engine 140 in considering and/or selecting an SME or a group of SMEs 114 for consultation for queries made during a particular conference meeting.

Figure 6:
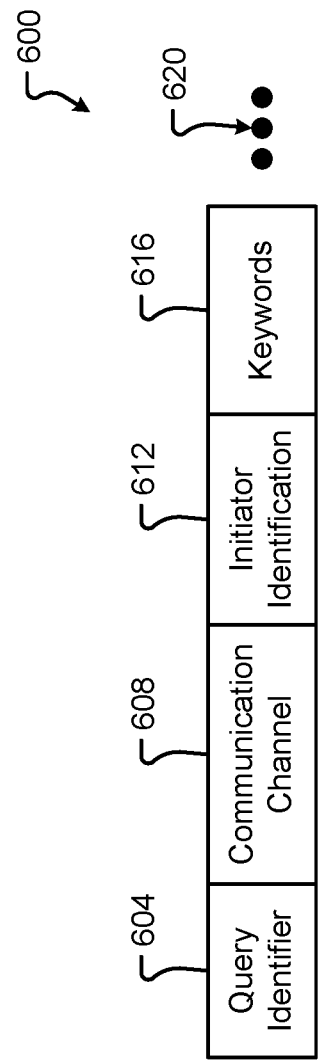
FIG. 6 is a block diagram depicting an in-meeting query data structure used in accordance with embodiments of the present disclosure.

FIG. 6 shows a block diagram depicting a query data structure 600 in accordance with at least some embodiments of the present disclosure. The query data structure 600 may include a number of fields that may be used in the various communication flows, methods, and processes outlined herein. The query data structure 600 may be used by the AI/ML engine 140 in determining suggested responses to queries raised in a conference meeting. Additionally or alternatively, the query data structure 600 may be used in conjunction with the SME data structure 500 in determining candidate SMEs for consideration in consulting for the in-meeting instant query assistance methods performed by the conferencing server 116. The query data structure 600 depicted in FIG. 6 includes a plurality of data fields that allow the AI/ML engine 140 to analyze a query, determine a suggested response to the query (e.g., for forwarding or sending to an SME), and/or selecting an SME or a group of SMEs 114 for consultation regarding queries made during a particular conference meeting. Examples of these data fields include, without limitation, a query identifier field 604, a communication channel field 608, an initiator identification field 612, a keywords field 616, and more 620.

The query identifier field 604 may be used to store data that identifies a query raised by a participant in a conference meeting. The identification may be a query name, phrase, word, symbol, number, character, and/or combination thereof. In some embodiments, the identification in the query identifier field 604 may correspond to a time (e.g., a timestamp, etc.) that a query was raised in a conference meeting. In one embodiment, the information in the query identifier field 604 may define when a query was made based on a sequence identifier. For example, the information may identify a first query made in a conference meeting as "Q1" and a second query made in a conference meeting as "Q2" and so on. In some embodiments, the query identifier field 604 may be used to one or more of order, organize, and/or differentiate between queries made by participants during a conference meeting.

The communication channel field 608 may be used to store data about a particular communication channel over which the query was raised. This data may include whether the query originated by speech (e.g., as part of the audio communication channel of an audio/video bridge service 124, etc.), text (e.g., as part of the chat communication channel of an instant messaging service 128, etc.), and/or combinations thereof. As described herein, the AI/ML engine 140 may determine to provide a response to a query in the form (e.g., speech or text) in which the query was originally raised. Additionally or alternatively, identifying the communication channel over which the query was raised may assist the conferencing server 116 in routing the query through various components of the AI-bot service 120.

The initiator identification field 612 may be used to store data that identifies the participant and/or conference client device 108A-N that raised a query during the conference meeting. The initiator identification field 612 may include a participant name, a conference client device 108 name, or unique identification thereof. This identification may be a name, phrase, word, symbol, number, character, and/or combination thereof. In some embodiments, the identification in the initiator identification field 612 may correspond to a MAC address, IP address, hardware identification, etc., and/or combinations thereof associated with the conference client device 108 of a participant in the conference meeting. The information in the initiator identification field 612 may be used by the AI/ML engine 140 in determining a frequency of queries raised by participants relative to one another, types of queries raised by participants, patterns of queries raised by participants, etc.

The keywords field 616 may be used to store data about keywords used in a query raised in a conference meeting. The keywords stored in the keywords field 616 may be extracted by one or more of a natural language processing unit 144 and/or a speech recognition engine 148. The extracted keywords may comprise any spoken content or written content in a voice query or a chat query, respectively. This content may be used by the AI/ML engine 140 to identify a query topic, determine candidate SMEs for consultation, and/or determine other details of the query. In some embodiments, the AI/ML engine 140 may determine, based on the information in the keywords field 616 whether past queries have been made with identical, similar, or substantially the same keywords and/or content. In one embodiment, the AI/ML engine 140 may use this information to determine suggested responses to the queries, that the AI/ML engine 140 provides to a selected SME for consideration.

Figure 7A:
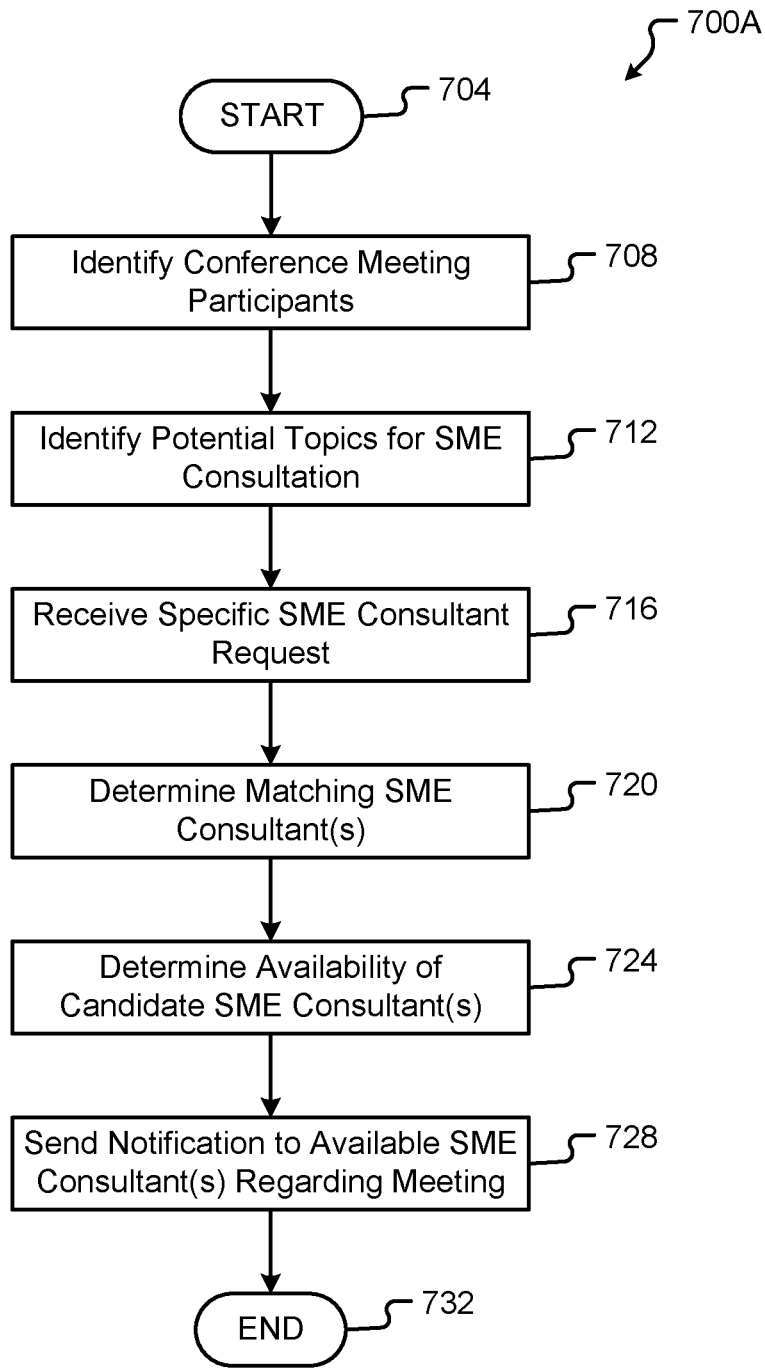
FIG. 7A is a flow diagram depicting a method of determining subject matter experts for use as query consultants in accordance with at least some embodiments of the present disclosure.

Referring now to FIG. 7A, a flow diagram depicting a method 700A of determining SMEs for use as query consultants is shown in accordance with at least some embodiments of the present disclosure. The method 700A can be executed as a set of computer-executable instructions executed by a computer system (e.g., the conferencing server 116, etc.) and encoded or stored on a computer readable medium (e.g., the memory 212, etc.). Hereinafter, the method 700A shall be explained with reference to the systems, components, modules, applications, software, data structures, user interfaces, etc. described in conjunction with FIGS. 1-6.

In some embodiments, the method 700A may be performed by the AI/ML engine 140 prior to a start time of a conference meeting and/or during the conference meeting. The method 700A begins at step 704 and proceeds by identifying participants of a conference meeting (step 708). In some embodiments, the participants of a conference meeting may be determined by referring to a meeting scheduling service 118, determining an identification of a particular conference client device 108 connected to a conference meeting via the audio/video bridge service 124 and/or the instant messaging service 128. Each participant may be associated with a unique identifier such as a name, device identification, and/or combinations thereof. In some embodiments, the identification of a participant in the conference meeting may correspond to the information stored in the initiator identification field 612 of the query data structure 600.

The method 700A may continue by identifying potential topics for SME consultation (step 712). These potential topics may be identified based on an agenda, identified topic(s), meeting title, meeting subject, content of a meeting invitation, titles and/or roles of participants involved in the conference meeting, and/or the like. In one embodiment, the method 700A may determine that when a group of participants are part of a conference meeting, the group of participants (based on historical conference meeting information stored in the storage memory 132, etc.) typically discusses one or more topics. For example, when the leaders of groups in a company participate in a conference meeting they may routinely discuss topics such as group performance, profitability, personnel issues, and/or marketing efforts. These routine topics of discussion may be recorded, or stored, in a memory (e.g., storage memory 132, etc.) as meeting minutes, topics associated with past queries raised, past agendas, and/or the like. Continuing this example, the AI/ML engine 140 may not only identify these topics as potential topics for discussion, but also identify the topics as being associated with the group of participants identified in step 708.

In some embodiments, the method 700A may receive a specific SME consultant request submitted from a participant of the conference meeting (step 716). It is an aspect of the present disclosure that a moderator or other privileged participant of a conference meeting may specify, as part of the scheduling a meeting, expected SMEs that may be required for consultation by the AI-bot 240 during the conference meeting. In one embodiment, a participant may enter SME information and/or select expected SMEs from a number of options presented while scheduling the meeting.

Next, the method 700A proceeds by determining candidate SMEs for use as consultants during the conference meeting based, at least in part, on the information obtained in steps 708, 712, and/or 716 (step 720). As described above, this determination may be based on machine learning using training examples from past query/response interactions, past use of SMEs in other conference meetings, and/or other information. In one embodiment, the AI/ML engine 140 may use the information identified regarding participants and/or the potential topics and compare this information with information associated with SMEs stored in one or more SME data structures 500. When the potential topics are determined to match skills and/or attributes (e.g., stored in the skills information field 512, etc.) of a particular SME, that particular SME may be considered as a candidate for SME consultation.

When one or more SMEs have been determined as candidates for consultation, the method 700A proceeds by determining an availability of the SMEs for a period of time during the conference meeting (step 724). In one embodiment, this determination may be based on IM presence, a listed availability status for the SME, and/or based on an interactive ping IM. In some embodiments, the AI/ML engine 140 may determine that a candidate SME is not available for use as a consultant during the period of time associated with the conference meeting. In this case, the AI/ML engine 140 may expand the pool of SMEs to select any set or all SMEs.

The method 700A proceeds by, for example, the conferencing server 116 sending a notification to the selected available SMEs with information regarding the conference meeting (step 728). While the notification is not a meeting invitation for the SMEs to participate in the conference meeting, the notification may inform the SMEs to remain available during the time the conference meeting is scheduled. In some embodiments, the notification may inform the SMEs of the potential topics for the consultation (e.g., identified in step 712). In one embodiment, the notification sent from the conferencing server 116 may include an identification of some or all of the conference meeting participants. The notification may include an option for the SMEs to reply and accept being used as a consultant. In some embodiments, the method 700A may repeat when new queries are raised and/or other conference meetings are scheduled. The method 700A ends at step 732.

Figure 7B:
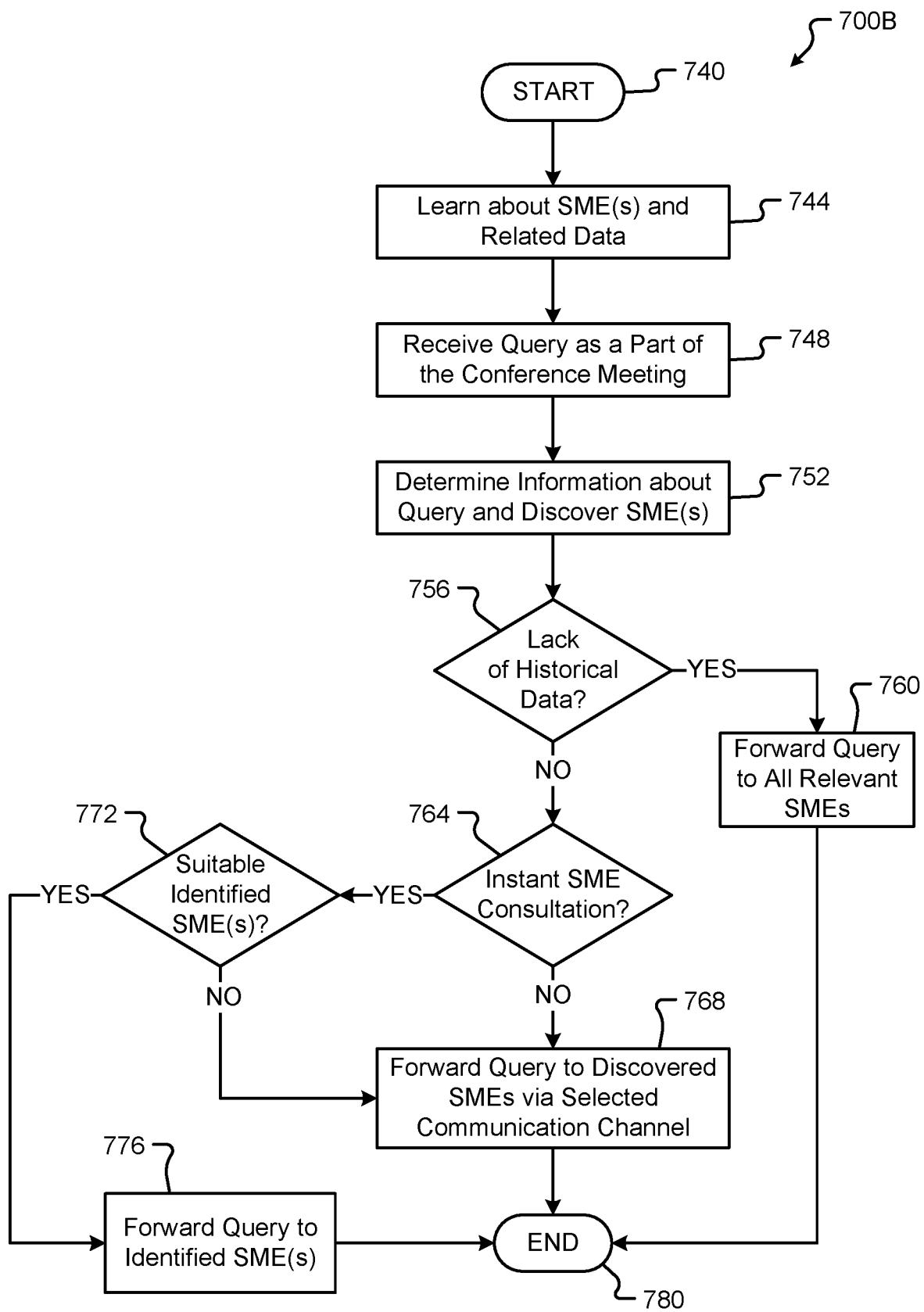
FIG. 7B is a flow diagram depicting a method of automatically determining and communicating with subject matter experts in accordance with at least some embodiments of the present disclosure.

FIG. 7B is a flow diagram depicting a method 700B of automatically determining and communicating with SME(s) in accordance with at least some embodiments of the present disclosure. The method 700B can be executed as a set of computer-executable instructions executed by a computer system (e.g., the conferencing server 116, etc.) and encoded or stored on a computer readable medium (e.g., the memory 212, etc.). Hereinafter, the method 700B shall be explained with reference to the systems, components, modules, applications, software, data structures, user interfaces, etc. described in conjunction with FIGS. 1-7A.

In some embodiments, the method 700B may be performed by the AI-bot service 120 prior to a start time of a conference meeting and/or during the conference meeting. The method 700B begins at step 740 and proceeds by learning about SME(s) and related data (step 744). The AI-bot service 120 may learn about SME(s) and related details based on one or more learning and input sources. The learning may be based on an initial learning of the AI-bot service 120, learning on-the-fly, and/or via an "Instant SME Consultation" option selected by a moderator, or other privileged participant, associated with the conference meeting.

The initial learning performed by the AI-bot service 120 may be based on organization level data source. For instance, one data source may contain SME(s) communication addresses, their expertise topic/subjects associated with a skill set, an expertise area, and/or SME(s) current active projects. The AI-bot service 120 may also be trained using any number of previous conference meeting details, follow-up queries and answers from SME(s).

Once initial learning is performed, the AI-bot service 120 may begin learning on-the-fly based on information associated with various conference meetings. In some embodiments, the AI-bot service 120 may learn factors with respect to identifying best SME(s) including, but in no way limited to, accuracy of query responses, swiftness of query responses, response feedback from the participants, response turnaround time, extra skills, expertise on new topics, preferable communication channel etc.

In some embodiments, an option may be made available for a moderator, or other privileged participant, of the conference meeting to configure "Instant SME Consultation" details while scheduling the conference meeting. This option may allow the configuration at the organization level, if the moderator, or privileged participants, are anticipating certain queries and one or more SME(s) are known prior to the conference meeting. In some embodiments, this option may be available while scheduling the conference meeting or any time before the conference meeting reminder time.

Next, the method 700B proceeds by receiving a query made by a participant in a conference meeting (step 748). The query may be received when the participant provides audio content (e.g., speech, etc.) over an audio communication channel and/or when the participant provides text content (e.g., chat, etc.) over a chat communication channel, as described herein. In one embodiment, the participant may address the AI-bot 240 as part of the conference meeting before raising a query. In one embodiment, the AI-bot 240 and/or the AI/ML engine 140 may determine, in conjunction with the natural language processing unit 144 and/or the speech recognition engine 148, that a query has been raised based on historical queries raised and training provided to the learning/training module 214.

The method 700B may continue by the AI-bot service 120 analyzing the query received for information (step 752). In some embodiments, this analysis may include extracting keywords, in conjunction with the natural language processing unit 144 and/or the speech recognition engine 148, from the query and comparing the extracted keywords to past queries, previous responses to queries, and/or combinations thereof. In some embodiments, the analysis may determine a topic or context of the query and/or other information such as a time of the query, an originator of the query, and/or other information stored in the query data structure 600. Based on the information from the analysis, the AI-bot service 120 may identify, or discover, the best SME(s) to handle the query. This discovery may be performed by the AI-bot service 120 in one or more identifying phases. For instance, in response to receiving queries, the AI-bot service 120 may determine/identify the best SME(s) associated with the topic by analyzing the historical data of SME(s) such as accuracy and swiftness of the query response and the availability of SME(s) during the conference meetings.

In some embodiments, the method 700B may proceed by the AI-bot 240 determining whether there is sufficient historical data to determine the best SME(s) for the query received (step 756). When the AI-bot 240 determines that there is not enough historical data available to learn, or determine, the best SME(s) for the query received, the method 700B proceeds by forwarding the query to all relevant (e.g., available, active, highly rated, etc.) SME(s) (step 760).

On the other hand, when the AI-bot 240 determines that enough historical data is available to learn, or determine, the best SME(s) for the query received, the method 700B proceeds by determining whether an "Instant SME Consultation" option has been configured or selected (step 764). In one embodiment, "Instant SME Consultation" details are configured by a moderator or privileged participants, which specifies one or more SME(s) for anticipated topics for the conference meeting. When the "Instant SME Consultation" option has been configured, the AI-bot service 120 may proceed by determining whether the selected, or identified, SME(s) are available and apply to the query being raised (step 772). In the event that the AI-bot service 120 determines the configured SME(s) are not suitable to answer the queries (e.g., the instant query is associated with a different topic from which the SME(s) were originally configured, or selected, etc.) the SME(s) may be determined to be not suitable and the method 700B proceeds to step 768. However, if the configured SME(s) are suitable to answer the queries (e.g., the instant query is associated with a topic for which the configured SME(s) were selected, etc.) the configured SME(s) may be given preference over other SME(s) (e.g., other discovered SME(s), etc.) to provide a response to the query. In this case, the method 700B proceeds by forwarding the query to the identified configured SME(s).

As provided above, when no suitable identified SME(s) in an "Instant SME Consultation" option are determined or when there is no Instant SME Consultation" option selected, the method 700B may proceed by forwarding the query to the discovered SME(s) via a selected communication channel (e.g., preferred communication channel, available communication channel, and/or other non-conference meeting related communication channel) (step 768). The method 700B may end at step 780 or repeat when a new query is received in the conference meeting at step 748.

Figure 8:
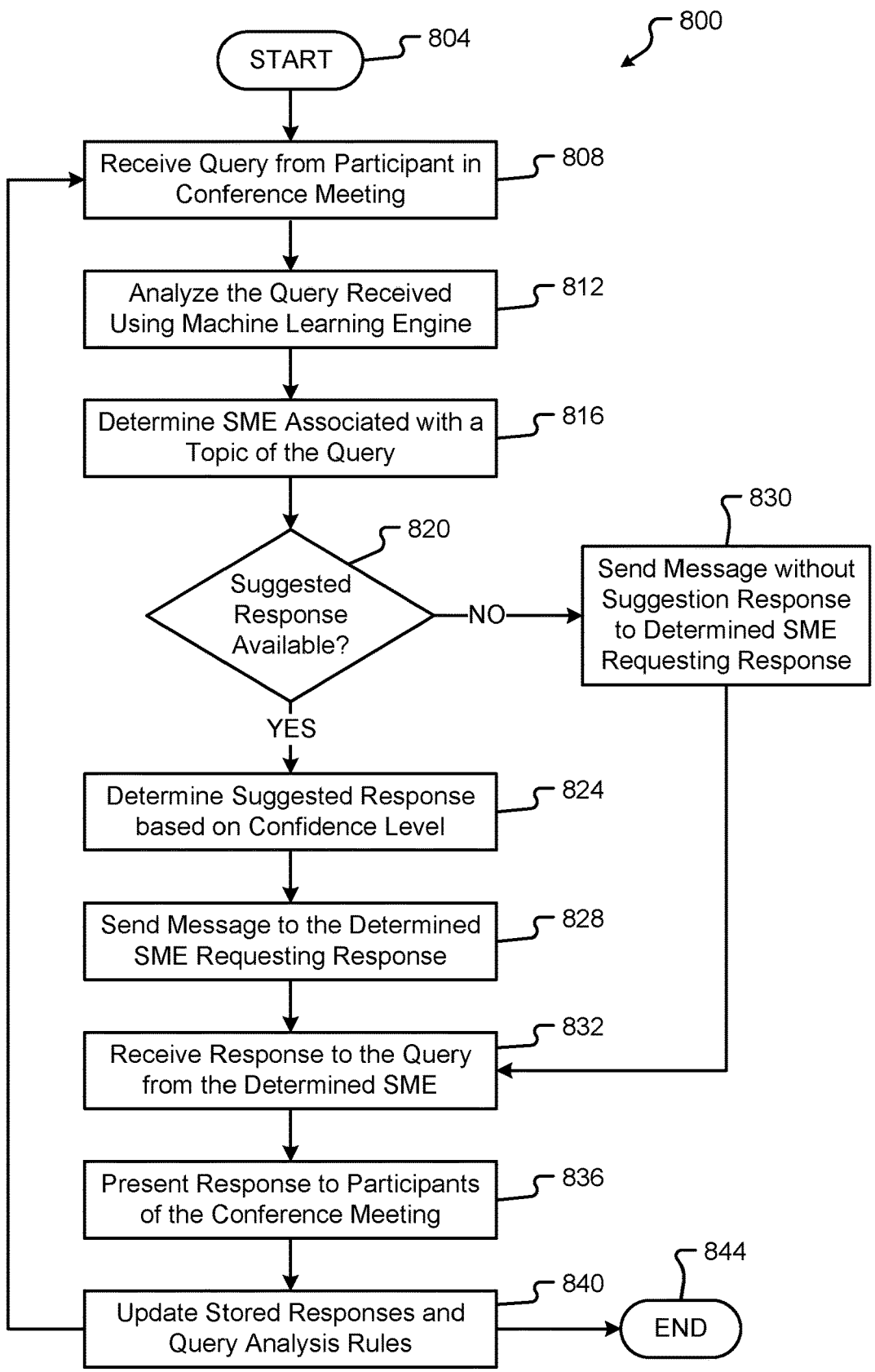
FIG. 8 is a flow diagram depicting a method for automatically communicating with subject matter experts on behalf of participants in a conference meeting without including subject matter experts in the conference meeting in accordance with at least some embodiments of the present disclosure.

FIG. 8 is a flow diagram depicting a method 800 for automatically communicating with SMEs on behalf of participants in a conference meeting without including the SMEs in the conference meeting in accordance with at least some embodiments of the present disclosure. The method 800 can be executed as a set of computer-executable instructions executed by a computer system (e.g., the conferencing server 116, etc.) and encoded or stored on a computer readable medium (e.g., the memory 212, etc.). Hereinafter, the method 800 shall be explained with reference to the methods, systems, components, modules, applications, software, data structures, user interfaces, etc. described in conjunction with FIGS. 1-7B.

The method 800 begins at step 804 and proceeds by receiving a query from a participant in a conference meeting (step 808). The query may be received when the participant provides audio content (e.g., speech, etc.) over an audio communication channel and/or when the participant provides text content (e.g., chat, etc.) over a chat communication channel, as described herein. In one embodiment, the participant may be required to address the AI-bot 240 instantiated as part of the conference meeting before raising a query. For example, the participant may be required to prefix any query with the phrase "AI-bot, query." In some embodiments, this prefix may alert the AI-bot service 120, automatically monitoring communications of the conference meeting, that a query is about to follow the phrase. In one embodiment, the AI/ML engine 140 may determine, in conjunction with the natural language processing unit 144 and/or the speech recognition engine 148, that a query has been raised based on historical queries raised and training provided to the learning/training module 214.

Next, the method 800 proceeds by analyzing the query received using the AI/ML engine 140 (step 812). In some embodiments, this analysis may include extracting keywords, in conjunction with the natural language processing unit 144 and/or the speech recognition engine 148, from the query and comparing the extracted keywords to past queries (e.g., stored in memory of the conferencing server 116, etc.). In some embodiments, the analysis may determine a topic of the query and/or other information such as a time of the query, an originator of the query, and/or other information stored in the query data structure 600. The AI/ML engine 140 may build the query data structure 600 for a particular query in response to the analysis of step 812.

The method 800 may continue by determining at least one SME associated with a topic of the query (step 816). The determination of SMEs may be based on one or more of the methods 700A, 700B described in conjunction with FIGS. 7A-7B and/or based on an SME selected or specified as part of organizing a meeting. The AI/ML engine 140 may determine candidate SMEs based on the topic of the query matching attributes or skills of the SMEs, a combination of participants in the meeting, and/or an availability of the SMEs for a time period the conference meeting will be held.

The AI/ML engine 140, and more specifically, the recommendation engine 216, may refer to information stored in one or more of a response database 220 and an AI-bot query response database 224 to determine whether a suggested response to the query is available based on historical data and machine learning (step 820). In some embodiments, determining whether a suggested response is available may depend on a determined confidence level associated with potential responses to past queries. For instance, the structure and content of the query made as part of the conference meeting may be compared to the structure and content of past queries made and stored in one or more of the databases 220, 224. In some embodiments, this comparison may determine a similarity of one query to another. When the AI/ML engine 140 is unable to determine a suggested response to the query, there may be insufficient data stored in the databases 220, 224, and/or the data is out of date (e.g., the data related to queries, or questions, that are time-sensitive). A time-sensitive query may request the status of a group, a measured performance, a statistic, and/or the like that is associated with a particular point in time. In these cases, the method 800 may proceed to request a response to the query without providing a suggested response to a selected SME (step 830).

When at least one suggested response is determined to be available, the method 800 may proceed by determining a suggested response to the query based on a determination of confidence levels associated with the suggested response and the query (step 824). The AI/ML engine 140 may determine that, in view of the content of the query, past responses to queries include a response that applies, or is likely to apply, to the query raised in the instant conference meeting. The confidence level may assign a score to one or more responses in the response database 220 and/or the AI-bot query response database 224. For example, a score between "0" and "100" may be assigned to a confidence level for past queries when considered relative to the instant query, where "0" is a "no-confidence" score and "100" is a "total confidence" score. Continuing this example, a confidence level of 1 may be excluded from consideration in providing to SMEs, while a confidence level of 80 may be included in the consideration of whether a suggested response to the query should be sent to SMEs. More detail regarding the determination of confidence levels is described in conjunction with FIG. 9.

The method 800 continues by sending a message to the determined SME(s) requesting a response to the query (step 828). This message may be sent in a communication, between the AI-bot service 120 and the SME(s), that is outside of, or external to, the conference meeting. Stated another way, the SME(s) may never be connected to the conference meeting, or even be a party in the conference meeting. In this manner, the AI-bot service 120 (e.g., via an instantiated AI-bot 240) may automatically act on behalf of the participants in the conference meeting and/or on behalf of the SME(s) when posting responses to the conference meeting. The message may include some or all of the content from the query raised in the conference meeting. In some embodiments, the query may include the suggested response to the query. In one embodiment, the suggested response may be sent to the SMEs only when the confidence level of the suggested response is higher that a predetermined confidence level threshold and is also higher than a confidence level of any other response in the historical responses to queries stored in the database relative to the query. When the suggested response to the query is sent to the SME(s) as part of the message, the message may include one or more selectable options for the SME(s) to accept the suggested response to the query as their response to the query and/or decline to accept the suggested response to the query and provide their own response to the query. In any event, once provided (e.g., either by accepting the suggested response to the query or by providing a different response to the query) the response becomes the response to the query from the SME(s). In some embodiments, the SME may be restricted from providing any information other than a response to the query.

The method 800 may continue when the response to the query is received from one or more SME(s) (step 832). In response to receiving the response to the query, the method 800 may proceed by processing the response, via the AI-bot service 120, by converting the response from one format to another (e.g., audio-to-text, text-to-audio, etc.) and/or restating the response to the query in different terms than received. In one embodiment, this processing may correspond to the communication flow associated with step S407 described in conjunction with FIG. 4. In some embodiments, the AI-bot service 120 may receive a responses to the query from multiple SMEs. In this example, the AI-bot service 120 may determine a common response to the query, select the first response to the query received, and/or select a response to the query from the SME having the highest rating. The rating of the SME may be stored in the rating information field 516 of the SME data structure 500 associated with one or more SMEs, as described in conjunction with FIG. 5. In one embodiment, the AI-bot service 120 may compile a response to the query based on a plurality of responses received from SMEs. For instance, the response to the query may incorporate a first portion from a first SME and a second portion from a second SME and so on.

The method 800 proceeds by presenting the response to the query to the participants of the conference meeting (step 836). In some embodiments, the response to the query may be presented as part of the conference meeting, for example, over the audio channel of the audio/video bridge service 124 and/or over the chat channel of the instant messaging service 128. Presentation of the response to the query may comprise providing the response in the form of synthesized speech by the conferencing server 116. In one embodiment, the presentation of the response may be as a communication, text message, IM, or other text-based output rendered to a display of at least one of the conference client devices 108A-N.

Based on the response to the query, the method 800 may proceed by updating stored responses in the response database 220 and/or the AI-bot query response database 224 (step 840). Updating the stored responses may comprise adding the response to either, or both, databases 220, 224 along with an identification of the query, such as query content, keywords extracted from the query, and/or the like. In some embodiments, the response to the query may be added to the response database 220 and then used to update the AI-bot query response database 224 by further training (e.g., using the response to the query, etc.) via the learning/ training module 214. The method 800 may repeat by receiving another query (at step 808) or end at step 844.

Figure 9:
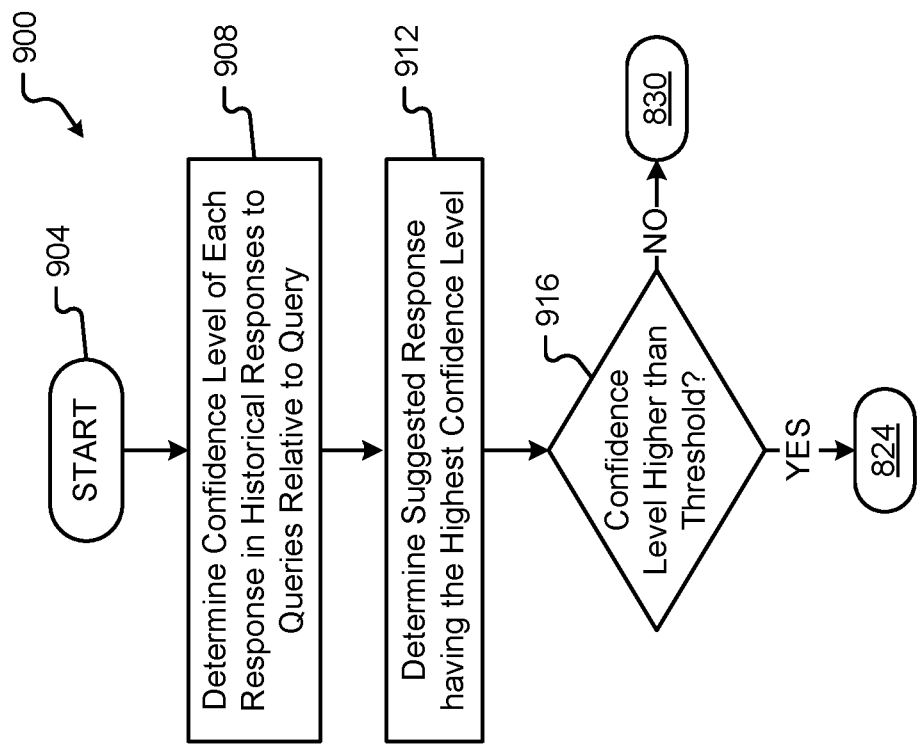
FIG. 9 is a flow diagram depicting a method for automatically determining suggested responses to queries to present to subject matter experts outside of a conference meeting in accordance with embodiments of the present disclosure.

FIG. 9 is a flow diagram depicting a method 900 for automatically determining suggested responses to queries to present to SMEs outside of a conference meeting in accordance with embodiments of the present disclosure. The method 900 can be executed as a set of computer-executable instructions executed by a computer system (e.g., the conferencing server 116, etc.) and encoded or stored on a computer readable medium (e.g., the memory 212, etc.). Hereinafter, the method 900 shall be explained with reference to the methods, systems, components, modules, applications, software, data structures, user interfaces, etc. described in conjunction with FIGS. 1-8.

The method 900 begins at step 904 and proceeds by determining a confidence level of each response in historical responses to queries relative to the query raised in the conference meeting (step 908). In some embodiments, this step may precede step 824 of the method 800 described in conjunction with FIG. 8. In one embodiment, this step may be a part of step 824 of the method 800 described in conjunction with FIG. 8. As provided above, based on the content of the query, the method 900 may determine a confidence level associated with a group of past responses in the response database 220 and/or the AI-bot query response database 224. These historical responses may include all or fewer responses than are in each database 220, 224. Determining the confidence level may comprise using machine learning (e.g., via the AI/ML engine 140, etc.) and neural networks developed to evaluate and recognize matching criteria between the query and historical responses stored in the respective databases 220, 224. More matching criteria between the query and the historical responses indicates a higher confidence level and corresponding value. Additionally or alternatively, fewer matching criteria between the query and the historical responses indicates a lower confidence level and corresponding value.

Once a confidence level is determined for the group of past responses in the response, the method 900 may proceed by determining a suggested response having the highest confidence level of all of the historical responses evaluated (step 912). In one embodiment, this determination may comprise comparing the confidence level values associated with each historical response to one another and ordering the confidence level values from highest to lowest, or vice versa.

Next, the method 900 proceeds by the AI/ML engine 140 determining whether the confidence level is higher than a predetermined confidence level value threshold (step 916). In some embodiments, the AI/ML engine 140 may not determine that a suggested response exists when the confidence level value of the suggested response determined in step 912 fails to exceed the predetermined confidence level value threshold. By way of example, the AI/ML engine 140 may determine that any suggested response to a query having a confidence level value below "60" should not be forwarded to SMEs as part of the message sent to SMEs requesting a response to the query. In this case, the AI/ML engine 140 and the conferencing server 116 may only send the suggested response to the query when the confidence level value of the suggested response is above, or higher than, the predetermined confidence level value threshold (e.g., greater than "60" in the example above). Accordingly, when the confidence level value of the suggested response is not higher than the predetermined confidence level value threshold, the method 900 may proceed to step 830 of the method 800. Conversely, when the confidence level value of the suggested response is higher than the predetermined confidence level value threshold, the method 900 may proceed to step 824 of the method 800.

Figure 10:
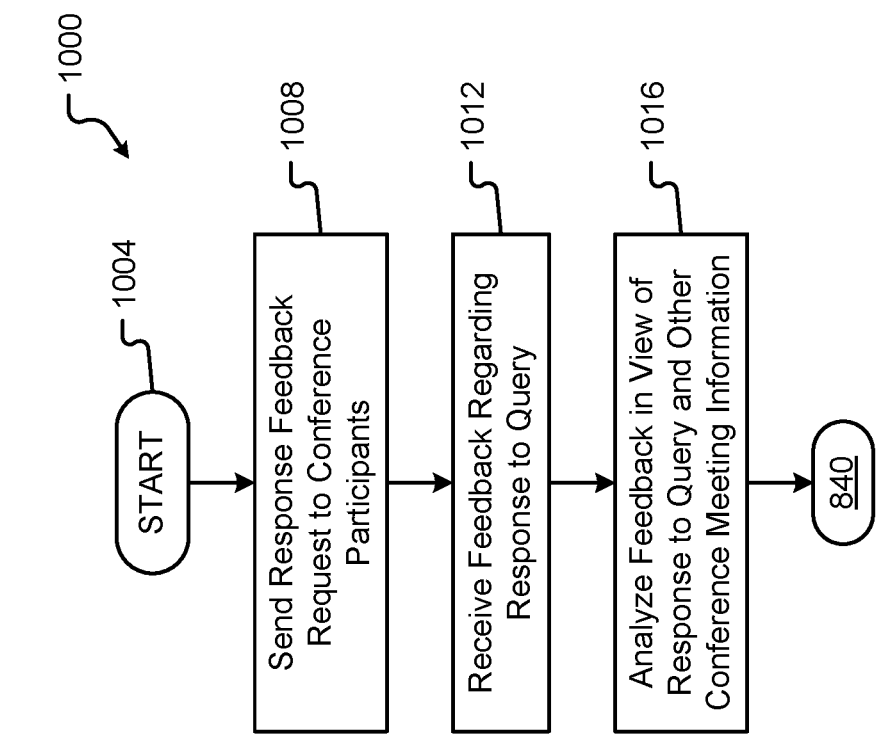
FIG. 10 is a flow diagram depicting a method for automatically training a recommendation and machine learning engine using feedback on previously provided responses to queries accordance with at least some embodiments of the present disclosure.

FIG. 10 is a flow diagram depicting a method 1000 for automatically training a recommendation engine 216 and/or AI/ML engine 140 using feedback on previously provided responses to queries accordance with at least some embodiments of the present disclosure. The method 1000 can be executed as a set of computer-executable instructions executed by a computer system (e.g., the conferencing server 116, etc.) and encoded or stored on a computer readable medium (e.g., the memory 212, etc.). Hereinafter, the method 1000 shall be explained with reference to the methods, systems, components, modules, applications, software, data structures, user interfaces, etc. described in conjunction with FIGS. 1-9.

The method 1000 begins at step 1004 and proceeds when a response feedback request is sent to conference participants regarding the response to the query provided by the AI-bot service 120 (step 1008). The conferencing server 116 may send the response feedback request as part of a message at the end of conference meeting. For instance, the message may correspond to the communication described in conjunction with step S409 of the communication flows of FIG. 4. In some embodiments, the participants of the conference may provide feedback independent of receiving a response feedback request. The method 1000 may be a part of the method 800 described in conjunction with FIG. 8. For instance, the method 100 may precede and/or be a part of step 840 of the method 800. In any event the message comprising the response feedback request may ask for feedback regarding an accuracy of the response to the query, a timeliness of the response to the query, whether the response to the query met expectations, exceeded expectations, or fell below expectations, and/or other questions that the AI/ML engine 140 may use to determine a rating of the SMEs and/or a quality/accuracy of the response to the query provided by the SMEs.

Next, the method 1000 continues by receiving the feedback regarding the response to the query (step 1012). As provided above, the feedback may be part of a message, an interactive text-based messaging communication session, an audio call, and/or a bit sequence answering specific ordered questions that were part of the response feedback request.

Upon receiving the feedback, the method 1000 may proceed by analyzing, for example, via the AI/ML engine 140, the feedback in view of the response to the query and other conference meeting information (step 1016). For example, based on the feedback, the AI/ML engine 140 may update the responses in the response database 220, the AI-bot query response database 224, and/or train one or more of the recommendation engine 216, the query engine 228, and the response generator 236. When the feedback is positive, for example, identifying the response to the query as being accurate, the AI/ML engine 140 may include the response to the query in the response database 220 and/or the AI-bot query response database 224 with a high, or number positive (e.g., a number greater than zero, etc.), confidence level weighting value. The weighting value may be used to increase a confidence value of the response to the query stored (relative to the query). Stated another way, when a future query is raised substantially, or identically, matching the query associated with the response to the query stored, the AI/ML engine 140 may determine that the confidence level is higher than a stored response without the weighting value. Additionally or alternatively, when the feedback is negative, for example, identifying the response to the query as being inaccurate, the AI/ML engine 140 may include the response to the query in the response database 220 and/or the AI-bot query response database 224 with a low, or number negative (e.g., a number less than zero, etc.), confidence level weighting value. The low weighting value may be used to reduce a confidence value of the response to the query stored (relative to the query). In this case, when a future query is raised substantially, or identically, matching the query associated with the reduced confidence level response to the query stored, the AI/ML engine 140 may determine that the confidence level is lower than a stored response without the weighting value.

In some embodiments, the feedback may be used by the AI/ML, engine 140 to provide better future SME selections (e.g., for consideration as candidates for consultation) and/or to provide better and/or quicker responses to queries raised in a conference meeting. In some embodiments, the timeliness of a response may be used to affect the rating (e.g., stored in the rating information field 516 of the SME data structure 500) of an SME. Quicker responses may correspond to an increased, or higher, rating of the SME. Slower responses may correspond to a decreased, or lower, rating of the SME. In some embodiments, the method 1000 may end or proceed to step 840 of the method 800 described in FIG. 8.

Any of the steps, functions, and operations discussed herein can be performed continuously and automatically.

The exemplary systems and methods of this disclosure have been described in relation to conference meetings and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., conferencing servers, client devices, etc.), it should be appreciated that the components, systems, and/or methods described herein may be employed as part of a peer-to-peer network or other network. As can be appreciated, in a peer-to-peer network, the various components or systems described in conjunction with the communication system 100 may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a communication system, comprising: a server, comprising: a network communications interface; a processor coupled to the network communications interface; and a memory coupled to and readable by the processor and storing therein instructions that, when executed by the processor, cause the processor to: receive a query from a conference client device participating in a conference meeting comprising a plurality of connected conference client devices, each conference client device of the plurality of conference client devices associated with a respective participant; analyze the query to determine a subject matter expert absent from the conference meeting and associated with a topic of the query; send a message to a client device of the subject matter expert requesting a response to the query from the subject matter expert while the conference meeting is in progress; receive the response to the query from the client device of the subject matter expert; and cause an automated bot to present the response to the query to the plurality of connected conference client devices on behalf of the subject matter expert without requiring the subject matter expert to be included in the conference meeting.

Aspects of the above communication system include wherein the instructions further cause the processor to: determine, automatically based on machine learning using historical data associated with a plurality of subject matter experts and using historical data of past conference meetings, an identification of a group of candidate subject matter experts to be considered for consultation, and wherein the subject matter expert absent from the conference meeting and associated with the topic of the query is selected from the group of candidate subject matter experts. Aspects of the above communication system include, wherein the automated bot is caused to present the response to the query to the plurality of connected conference client devices while the conference meeting is in progress without any participant of the conference meeting communicating with the subject matter expert and without ever connecting the client device of the subject matter expert to the conference meeting. Aspects of the above communication system include wherein the query is at least one of a voice-based query made as part of an audio communication in the conference meeting and a text-based query made as part of a chat communication in the conference meeting, and wherein prior to sending the message to the client device of the subject matter expert, the instructions further cause the processor to: analyze content of the query using a natural language processing unit to determine a suggested response to the query from a plurality of stored responses. Aspects of the above communication system include wherein in response to analyzing the content of the query, the instructions further cause the processor to: determine that there is no suggested response to the query in the plurality of stored responses, and wherein the message is absent the suggested response to the query. Aspects of the above communication system include wherein the message sent to the client device of the subject matter expert comprises the suggested response and an option for the subject matter expert to accept the suggested response as the response to the query via an input provided by the subject matter expert via the client device of the subject matter expert. Aspects of the above communication system include wherein prior to receiving the query, the instructions further cause the processor to: receive, as a part of scheduling the conference meeting, an identification of a group of candidate subject matter experts to be considered for consultation while the conference meeting is in progress. Aspects of the above communication system include wherein prior to receiving the query, the instructions further cause the processor to: determine, automatically based on information about the conference meeting, a group of subject matter experts available for consultation while the conference meeting is in progress. Aspects of the above communication system include wherein after determining the group of subject matter experts, the instructions further cause the processor to: send a consultation reminder message to the group of subject matter experts comprising an agenda of the conference meeting, a subject of the conference meeting, and a time that the group of subject matter experts are expected to remain available for consultation during the conference meeting, when the group of candidate subject matter experts are configured. Aspects of the above communication system include wherein after causing the response to the query to be presented to the plurality of connected conference client devices, the instructions further cause the processor to: receive feedback from at least one conference client device of the plurality of conference client devices regarding an accuracy of the response to the query; and analyze the feedback to increase an accuracy of the plurality of stored responses. Aspects of the above communication system include wherein the server further comprises a machine learning engine that is executable by the processor and that enables the processor to: analyze the query to determine a suggested response to the query; determine, in response to the analysis of the query and based on an identification of each participant in the conference meeting, and historical responses to queries stored in a database, a confidence level associated with each response in the historical responses to queries stored in the database relative to the query; and send the suggested response as part of the message sent to the client device of the subject matter expert when a confidence level of the suggested response in the historical responses to queries stored in the database relative to the query is higher than a confidence level of any other response in the historical responses to queries stored in the database relative to the query.

Embodiments of the present disclosure include a method, comprising: receiving, by a processor via a network communications interface, a query from a conference client device participating in a conference meeting comprising a plurality of connected conference client devices, each conference client device of the plurality of conference client devices associated with a respective participant; analyzing, by the processor, the query to determine a subject matter expert absent from the conference meeting and associated with a topic of the query; sending, by the processor via the network communications interface, a message to a client device of the subject matter expert requesting a response to the query from the subject matter expert while the conference meeting is in progress; receiving, by the processor, the response to the query from the client device of the subject matter expert; and causing, by the processor, an automated bot to present the response to the to the plurality of connected conference client devices on behalf of the subject matter expert without requiring the subject matter expert to be included in the conference meeting.

Aspects of the above method include wherein the automated bot is caused to present the response to the query to the plurality of connected conference client devices while the conference meeting is in progress without any participant of the conference meeting communicating with the subject matter expert and without ever connecting the client device of the subject matter expert to the conference meeting. Aspects of the above method include wherein the query is at least one of a voice-based query made as part of an audio communication in the conference meeting and a text-based query made as part of a chat communication in the conference meeting, and wherein prior to sending the message to the client device of the subject matter expert, the method further comprises: analyzing, by the processor, content of the query using a natural language processing unit to determine a suggested response to the query from a plurality of stored responses. Aspects of the above method include wherein the message sent to the client device of the subject matter expert comprises the suggested response and an option for the subject matter expert to accept the suggested response as the response to the query via an input provided by the subject matter expert via the client device of the subject matter expert. Aspects of the above method further comprising: upon receiving the query determining, automatically by the processor based on machine learning using historical data associated with a plurality of subject matter experts, using historical data of past conference meetings, and using information about the conference meeting, a group of candidate subject matter experts available for consultation while the conference meeting is in progress; and prior to receiving the query, sending, by the processor via the network communications interface, a consultation reminder message to the group of candidate subject matter experts comprising an agenda of the conference meeting, a subject of the conference meeting, and a time that the group of candidate subject matter experts are expected to remain available for consultation during the conference meeting, when the plurality of subject matter experts are configured. Aspects of the above method include wherein after causing the response to the query to be presented to the plurality of connected conference client devices, the method further comprises: receiving feedback from at least one conference client device of the plurality of conference client devices regarding an accuracy of the response to the query; and analyzing, by the processor, the feedback to increase an accuracy of the plurality of stored responses.

Embodiments of the present disclosure include a server, comprising: a processor; and a machine learning engine that is executable by the processor and that enables the processor to: receive a query from a conference client device participating in a conference meeting comprising a plurality of connected conference client devices, each conference client device of the plurality of conference client devices associated with a respective participant; analyze the query to determine a subject matter expert absent from the conference meeting and associated with a topic of the query; analyze the query to determine a suggested response to the query; send a message comprising the suggested response to the query to a client device of the subject matter expert requesting a response to the query from the subject matter expert while the conference meeting is in progress; receive the response to the query from the client device of the subject matter expert at least one of accepting the suggested response to the query as the response to the query and declining to accept the suggested response to the query and providing an alternative response as the response to the query; and cause an automated bot to present the response to the query to the plurality of connected conference client devices on behalf of the subject matter expert without requiring the subject matter expert to be included in the conference meeting.

Aspects of the above server include wherein content of the query is analyzed using artificial intelligence enabled by the machine learning engine as part of analyzing the query to determine the suggested response to the query. Aspects of the above server include wherein the server further comprises: a speech recognition engine that converts audio communications in the conference meeting comprising the query made as a voice query into text, and wherein the text is analyzed by a natural language processing unit as part of analyzing the query to determine the suggested response to the query. Aspects of the above server include wherein the machine learning engine further enables the processor to: determine, in response to the analysis of the query to determine the suggested response and based on an identification of each participant in the conference meeting, and historical responses to queries stored in a database, a confidence level associated with each response in the historical responses to queries stored in the database relative to the query; determine whether a confidence level of the suggested response in the historical responses to queries stored in the database relative to the query is higher than a predetermined confidence level threshold; and send the suggested response as part of the message sent to the client device of the subject matter expert only when the confidence level of the suggested response is higher that the predetermined confidence level threshold and is higher than a confidence level of any other response in the historical responses to queries stored in the database relative to the query.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

What is claimed is:

1. A communication system, comprising:
a server, comprising:
a network communications interface;
a processor coupled to the network communications interface; and
a memory coupled to and readable by the processor and storing therein instructions that, when executed by the processor, cause the processor to execute a machine learning engine that enables the processor to:
determine, based on information about a conference meeting, a group of subject matter experts available for consultation while the conference meeting is in progress;
send a consultation reminder message to the group of subject matter experts comprising an agenda of the conference meeting, a subject of the conference meeting, and a time that the group of subject matter experts are expected to remain available for consultation during the conference meeting;
receive a query from a conference client device participating in the conference meeting comprising a plurality of connected conference client devices, each conference client device of the plurality of connected conference client devices being associated with a respective participant, wherein an automated bot is triggered to receive the query using a keyword or phrase;
select a subject matter expert from the group of subject matter experts available for consultation and determine a preferred communication channel for the selected subject matter expert;
send, via the preferred communication channel, a message to a client device of the selected subject matter expert requesting a response to the query from the subject matter expert while the conference meeting is in progress;
receive the response to the query from the client device of the selected subject matter expert; and
cause the automated bot to present the response to the query to the plurality of connected conference client devices on behalf of the selected subject matter expert without requiring the selected subject matter expert to be included in the conference meeting.

2. The communication system of claim 1, wherein the machine learning engine further causes the processor to:
determine, automatically using historical data associated with a plurality of subject matter experts and using historical data of past conference meetings, an identification of a group of candidate subject matter experts to be considered for consultation while the conference meeting is in progress, and wherein the subject matter expert absent from the conference meeting and associated with a topic of the query is selected from the group of candidate subject matter experts.

3. The communication system of claim 1, wherein the automated bot is caused to present the response to the query to the plurality of connected conference client devices while the conference meeting is in progress without any participant of the conference meeting communicating with the subject matter expert and without ever connecting the client device of the subject matter expert to the conference meeting.

4. The communication system of claim 3, wherein the query is at least one of a voice-based query made as part of an audio communication in the conference meeting and a text-based query made as part of a chat communication in the conference meeting, and wherein prior to sending the message to the client device of the subject matter expert, the instructions further cause the processor to:
analyze content of the query using a natural language processing unit to determine a suggested response to the query from a plurality of stored responses.

5. The communication system of claim 4, wherein in response to analyzing the content of the query, the instructions further cause the processor to:
determine that there is no suggested response to the query in the plurality of stored responses, and wherein the message is absent the suggested response to the query.

6. The communication system of claim 4, wherein the message sent to the client device of the subject matter expert comprises the suggested response and an option for the subject matter expert to accept the suggested response as the response to the query via an input provided by the subject matter expert via the client device of the subject matter expert.

7. The communication system of claim 6, wherein prior to receiving the query, the instructions further cause the processor to:
receive, as a part of scheduling the conference meeting, an identification of a group of candidate subject matter experts to be considered for consultation while the conference meeting is in progress.

8. The communication system of claim 5, wherein after causing the response to the query to be presented to the plurality of connected conference client devices, the instructions further cause the processor to:
receive feedback from at least one conference client device of the plurality of connected conference client devices regarding an accuracy of the response to the query; and
analyze the feedback to increase an accuracy of the plurality of stored responses.

9. The communication system of claim 1, wherein the machine learning engine further enables the processor to:
analyze the query to determine a suggested response to the query;
determine, in response to analyzing the query and based on an identification of each participant in the conference meeting, and historical responses to queries stored in a database, a confidence level associated with each response in the historical responses to queries stored in the database relative to the query;

send the suggested response as part of the message sent to the client device of the subject matter expert when a confidence level of the suggested response in the historical responses to queries stored in the database relative to the query is higher than a confidence level of any other response in the historical responses to queries stored in the database relative to the query; and receive a selection of the suggested response or a response provided by the subject matter expert in real-time after the subject matter expert receives the message.

10. A method, comprising:

causing a processor of a server to execute a machine learning engine that enables the processor to:

determine, based on information about a conference meeting, a group of subject matter experts available for consultation while the conference meeting is in progress;

send, via a network communications interface, a consultation reminder message to the group of subject matter experts comprising an agenda of the conference meeting, a subject of the conference meeting, and a time that the group of subject matter experts are expected to remain available for consultation during the conference meeting;

receive, via the network communications interface, a query from a conference client device participating in the conference meeting comprising a plurality of connected conference client devices, each conference client device of the plurality of connected conference client devices being associated with a respective participant, wherein an automated bot is triggered to receive the query using a keyword or phrase;

select a subject matter expert from the group of subject matter experts available for consultation and determine a preferred communication channel for the subject matter expert;

send, via the network communications interface, a message to a client device via the preferred communication channel of the subject matter expert requesting a response to the query from the subject matter expert while the conference meeting is in progress;

receive the response to the query from the client device of the subject matter expert; and cause the automated bot to present the response to the plurality of connected conference client devices on behalf of the subject matter expert without requiring the subject matter expert to be included in the conference meeting.

11. The method of claim 10, wherein the automated bot is caused to present the response to the query to the plurality of connected conference client devices while the conference meeting is in progress without any participant of the conference meeting communicating with the subject matter expert and without ever connecting the client device of the subject matter expert to the conference meeting.

12. The method of claim 11, wherein the query is at least one of a voice-based query made as part of an audio communication in the conference meeting and a text-based query made as part of a chat communication in the conference meeting, and wherein prior to sending the message to the client device of the subject matter expert, the method further comprises:

analyzing, by the processor, content of the query using a natural language processing unit to determine a suggested response to the query from a plurality of stored responses.

13. The method of claim 12, wherein the message sent to the client device of the subject matter expert comprises the suggested response and an option for the subject matter expert to accept the suggested response as the response to the query via an input provided by the subject matter expert via the client device of the subject matter expert.

14. The method of claim 13, further comprising:

upon receiving the query, determining, automatically by the processor executing the machine learning engine using historical data associated with a plurality of subject matter experts, using historical data of past conference meetings, and using information about the conference meeting, a group of candidate subject matter experts available for consultation while the conference meeting is in progress; and prior to receiving the query, sending, by the processor via the network communications interface, a consultation reminder message to the group of candidate subject matter experts comprising an agenda of the conference meeting, a subject of the conference meeting, and a time that the group of candidate subject matter experts are expected to remain available for consultation during the conference meeting, when the plurality of subject matter experts are configured.

15. The method of claim 14, wherein after causing the response to the query to be presented to the plurality of connected conference client devices, the method further comprises:

receiving feedback from at least one conference client device of the plurality of connected conference client devices regarding an accuracy of the response to the query; and analyzing, by the processor, the feedback to increase an accuracy of the plurality of stored responses.

16. A server, comprising:

a processor; and a machine learning engine that is executable by the processor and that enables the processor to:

determine, automatically based on information about a conference meeting, a group of subject matter experts available for consultation while the conference meeting is in progress;

send a consultation reminder message to the group of subject matter experts comprising an agenda of the conference meeting, a subject of the conference meeting, and a time that the group of subject matter experts are expected to remain available for consultation during the conference meeting;

receive a query from a conference client device participating in the conference meeting comprising a plurality of connected conference client devices, each conference client device of the plurality of connected conference client devices being associated with a respective participant, wherein an automated bot is triggered to receive the query using a keyword or phrase;

analyze the query to determine a suggested response to the query;

select a subject matter expert from the group of subject matter experts available for consultation and determine a preferred communication channel for the subject matter expert;

send, via the preferred communication channel, a message comprising the suggested response to the query to a client device of the subject matter expert requesting a response to the query from the subject matter expert while the conference meeting is in progress;

receive the response to the query from the client device of the subject matter expert, wherein the response to the query comprises at least one of: accepting the suggested response to the query as the response to the query, and declining to accept the suggested response to the query and providing an alternative response as the response to the query; and cause the automated bot to present the response to the query to the plurality of connected conference client devices on behalf of the subject matter expert without requiring the subject matter expert to be included in the conference meeting.

17. The server of claim 16, wherein content of the query is analyzed using artificial intelligence enabled by the machine learning engine as part of analyzing the query to determine the suggested response to the query.

18. The server of claim 16, wherein the server further comprises:

a speech recognition engine that converts audio communications in the conference meeting comprising the query made as a voice query into text, and wherein the text is analyzed by a natural language processing unit as part of analyzing the query to determine the suggested response to the query.

19. The server of claim 16, wherein the machine learning engine further enables the processor to:

determine, in response to the analysis of the query to determine the suggested response and based on an identification of each participant in the conference meeting, and historical responses to queries stored in a database, a confidence level associated with each response in the historical responses to queries stored in the database relative to the query;

determine whether a confidence level of the suggested response in the historical responses to queries stored in the database relative to the query is higher than a predetermined confidence level threshold; and send the suggested response as part of the message sent to the client device of the subject matter expert only when the confidence level of the suggested response is higher that the predetermined confidence level threshold and is higher than a confidence level of any other response in the historical responses to queries stored in the database relative to the query.

* * * * *